United States Patent
Furuse et al.

(10) Patent No.: US 9,840,129 B2
(45) Date of Patent: Dec. 12, 2017

(54) VEHICLE, COOLING APPARATUS, AND COOLING METHOD

(75) Inventors: Kenji Furuse, Tokyo (JP); Masahiko Ikeo, Tokyo (JP); Hideaki Morishita, Tokyo (JP); Kentaro Kamei, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 1053 days.

(21) Appl. No.: 13/617,620

(22) Filed: Sep. 14, 2012

(65) Prior Publication Data
US 2013/0084790 A1    Apr. 4, 2013

(30) Foreign Application Priority Data

Sep. 29, 2011   (JP) .................. 2011-215658
Sep. 29, 2011   (JP) .................. 2011-215663
Sep. 29, 2011   (JP) .................. 2011-215665

(51) Int. Cl.
*B60H 1/00*   (2006.01)
*B60H 1/32*   (2006.01)

(52) U.S. Cl.
CPC ............ *B60H 1/3204* (2013.01); *B60H 1/32* (2013.01)

(58) Field of Classification Search
CPC ..................... B60H 1/3204; B60H 1/00742
USPC ......... 454/69, 75, 83, 105; 60/415, 418, 413
See application file for complete search history.

(56) References Cited

U.S. PATENT DOCUMENTS

| | | | |
|---|---|---|---|
| 3,958,900 A | 5/1976 | Ueno | |
| 4,798,053 A | 1/1989 | Chang | |
| 4,989,499 A | 2/1991 | Scoccia et al. | |
| 5,528,900 A * | 6/1996 | Prasad | B60H 1/2215 62/175 |
| 5,955,940 A | 9/1999 | Chen | |
| 7,886,552 B2 | 2/2011 | Wang et al. | |
| 8,657,046 B2 | 2/2014 | Caudill | |
| 9,074,588 B2 | 7/2015 | Khajepour et al. | |
| 2004/0031634 A1 | 2/2004 | Ching | |
| 2005/0282485 A1* | 12/2005 | Kato | B60H 1/243 454/136 |
| 2007/0285218 A1* | 12/2007 | Fletcher | B60N 2/002 340/457 |
| 2008/0296939 A1 | 12/2008 | Bajic et al. | |

(Continued)

FOREIGN PATENT DOCUMENTS

| | | |
|---|---|---|
| JP | H03-123775 | 12/1991 |
| JP | 2004-122847 | 4/2004 |

(Continued)

OTHER PUBLICATIONS

Translation of 2006168476A.*
Japanese Office Action dated Mar. 9, 2016 received in JP Patent Application No. 2011-215665 (with Machine English translation).

*Primary Examiner* — Vivek Shirsat
(74) *Attorney, Agent, or Firm* — Smith, Gambrell & Russell, LLP

(57) ABSTRACT

There are provided a vehicle, a cooling apparatus, and a cooling method. The vehicle includes passenger space to accommodate a user gets, a tank to store the compressed air, and a control unit to release the compressed air stored in the tank into the passenger space. The passenger space is cooled by discharging the compressed air into the passenger space.

20 Claims, 12 Drawing Sheets

(56) References Cited

U.S. PATENT DOCUMENTS

| | | | |
|---|---|---|---|
| 2009/0288902 A1* | 11/2009 | Adli | B60K 3/00 180/302 |
| 2013/0084789 A1 | 4/2013 | Morishita et al. | |
| 2013/0104995 A1 | 5/2013 | Morishita et al. | |
| 2015/0112493 A1 | 4/2015 | Haggerty et al. | |

FOREIGN PATENT DOCUMENTS

| | | | |
|---|---|---|---|
| JP | 2005-238911 | 9/2005 | |
| JP | 2006-168476 | 6/2006 | |
| JP | 2007-076546 | 3/2007 | |
| JP | 2007-168466 | 7/2007 | |
| JP | 2007-297965 | 11/2007 | |
| JP | 2008-183996 | 8/2008 | |
| JP | 2008-296901 | 12/2008 | |
| JP | 2010-184579 | 8/2010 | |
| JP | 2010-216739 | 9/2010 | |
| KR | 200759347 A * | 6/2007 | |
| KR | 20070059347 A * | 6/2007 | |
| KR | 20100097968 * | 9/2010 | B60H 1/08 |

* cited by examiner

VEHICLE, COOLING APPARATUS, AND COOLING METHOD

CROSS-REFERENCE TO RELATED APPLICATIONS

The present application claims priority from Japanese Patent Application Nos. 2011-215658, 2011-215663, and 2011-215665, filed on Sep. 29, 2011, the entire contents of which are hereby incorporated by reference.

BACKGROUND OF THE INVENTION

1. Field of the Invention

The present invention relates to a vehicle, a cooling apparatus, and a cooling method, which cool passenger space of a vehicle such as an automobile or the like.

2. Description of the Related Art

A vehicle such as an automobile or the like commonly has an air conditioning apparatus which starts a cooling operation to cool the passenger space thereof, when a user gets in the vehicle and starts its engine by operating an ignition key.

With such an existing air conditioning apparatus, a cooling cycle is started when a user gets in the vehicle and operates the ignition key to start the engine. Accordingly, time delay occurs until the passenger space is actually cooled. Therefore, in a situation where, for example, a vehicle is parked under the burning sun, its passenger space is heated, and thus a user has to endure the hot passenger space until the passenger space is cooled.

In order to solve such an existing problem, Japanese Unexamined Patent Application Publication (JP-A) Nos. 2006-168476, 2010-216739, 2008-296901, 2007-168466, 2008-183996, and 2005-238911 have disclosed techniques for releasing the compressed air into passenger space. In addition, JP-A No. 2007-297965 has disclosed a power generation and air cooling system taking advantage of pressure and heat of emission gas.

At the time of releasing such compressed air into passenger space, there are conditions to be considered regarding storing and releasing periods of the compressed air.

SUMMARY OF THE INVENTION

The present invention has been made in the light of such a situation, and aims to provide a cooling apparatus that is capable of performing suitable storing and releasing of the compressed air.

A first aspect of the present invention provides a vehicle including: passenger space that accommodates a user; a tank that is capable of storing the compressed air; and a control unit to release the compressed air stored in the tank into the passenger space. Storing of the compressed air into the tank is carried out when there is no user within the passenger space.

The vehicle may further include a detector to detect whether or not there is a user within the passenger space. In addition, according to information from the detector the control unit may determine that there is no user within the passenger space to start storing of the compressed air as to the tank.

The control unit may stop storing of the compressed air into the tank when a user gets into the vehicle during storing of the compressed air.

The control unit may release the compressed air stored in the tank into the passenger space when a user gets into the vehicle after storing of the compressed air into the tank is completed, and further the tank is cooled.

A second aspect of the present invention provides a cooling apparatus to cool passenger space of a vehicle that accommodates a user. The cooling apparatus includes: a tank that is capable of storing the compressed air; a detector to detect whether or not there is a user in the passenger space; and a control unit to release the compressed air stored in the tank into the passenger space. Storing of the compressed air into the tank is carried out when it is determined that there is no user in the passenger space, according to information from the detector.

A third aspect of the present invention provides a cooling method for a cooling apparatus to store the compressed air for cooling passenger space of a vehicle that accommodates a user into a tank. The cooling method includes the steps of: determining that there is no user in the passenger space, according to information from a detector; storing the compressed air in the tank; and releasing the compressed air stored in the tank into the passenger space at the time of boarding.

A fourth aspect of the present invention provides a vehicle including: passenger space that accommodates a user; a tank that is capable of storing the compressed air; and a control unit to release the compressed air stored in the tank into the passenger space, The control unit releases the compressed air stored in the tank into the passenger space during the period lasted before and after a user's boarding.

The control unit may start releasing from the tank before a user's boarding regarding the compressed air stored in the tank, and release the compressed air in stages so as to end releasing from the tank after a user's boarding.

The control unit may release, before a user's boarding, the high-pressure compressed air from the tank, and release, after a user's boarding, the low-pressure compressed air remaining in the tank after releasing of the high-pressure compressed air.

The control unit may release, after a user gets into the vehicle and further the pressure of the passenger space starts to decrease, the low-pressure compressed air remaining in the tank.

The control unit may suppress releasing amount at the time of releasing the low-pressure compressed air remaining in the tank.

A fifth aspect of the present invention provides a cooling apparatus to cool passenger space of a vehicle that accommodates a user. The cooling apparatus includes: a tank that is capable of storing the compressed air; and a control unit to release the compressed air stored in the tank into the passenger space. The control unit releases the compressed air stored in the tank into the passenger space during the period lasted before and after a user's boarding.

A sixth aspect of the present invention provides a cooling method for a cooling apparatus to store the compressed air for cooling passenger space of a vehicle that accommodates a user into a tank. The cooling method includes the steps of: storing the compressed air in the tank; and releasing the compressed air stored in the tank into the passenger space during the period lasted before and after a user's boarding.

A seventh aspect of the present invention provides a vehicle including: passenger space that accommodates a user; a tank that is capable of storing the compressed air; and a control unit to release the compressed air stored in the tank into the passenger space. The control unit releases, after a user's boarding, the compressed air into the passenger space.

The control unit may determine a user's boarding by detecting whether or not there is a user in the passenger space.

The control unit may detect whether or not there is a user in the passenger space, using at least one of a detection signal of a seat-belt wearing sensor or seat sensor, an image of in-vehicle monitor camera, and presence confirmation of a smart key within the vehicle.

An discharge vent of the compressed air in the passenger space may be provided. assuming that space occupied by the passenger when a passenger sits down in the passenger space is defined as first passenger space, and space other than the first passenger space in the passenger space is defined as second passenger space, the discharge vent of the compressed air releases the compressed air into the second passenger space.

The discharge vent may be provided within an in-vehicle facility provided to the passenger space. Alternatively, the discharge vent may be provided either one of toward the inner side face of the vehicle making up the passenger space and toward an in-vehicle facility.

The control unit may confirm, before releasing the compressed air, whether or not passenger space and outer ventilation, and release, after securing the ventilating air, the compressed air into the passenger space.

When the vent hole has been secured, the control unit may release the compressed air, and then close the vent hole.

The control unit may secure the vent hole by opening a window glass or door of the vehicle, and, alternatively, the vent hole by changing an air conditioning apparatus provided to the vehicle to an external air introduction mode.

The compressed air obtained by absorbing and compressing the inner air of the passenger space may be stored in the tank.

An eighth aspect of the present invention provides a cooling apparatus to cool passenger space of a vehicle that accommodates a user. The cooling apparatus includes: a tank that is capable of storing the compressed air; and a control unit to release the compressed air stored in the tank into the passenger space. The control unit releases the compressed air into the passenger space after a user's boarding.

A ninth aspect of the present invention provides a cooling method for a cooling apparatus to store the compressed air for cooling passenger space of a vehicle that accommodates a user into a tank. The cooling method includes the steps of: storing the compressed air in the tank; and releasing the compressed air stored in the tank into the passenger space after a user's boarding.

With the present invention, the compressed air stored in a tank is released into passenger space. The passenger space is cooled by the compressed air released into the passenger space. As a result thereof, with the present invention, the inside of the vehicle can immediately be cooled.

DESCRIPTION OF THE PREFERRED EMBODIMENTS

First Embodiment

Figure 1:
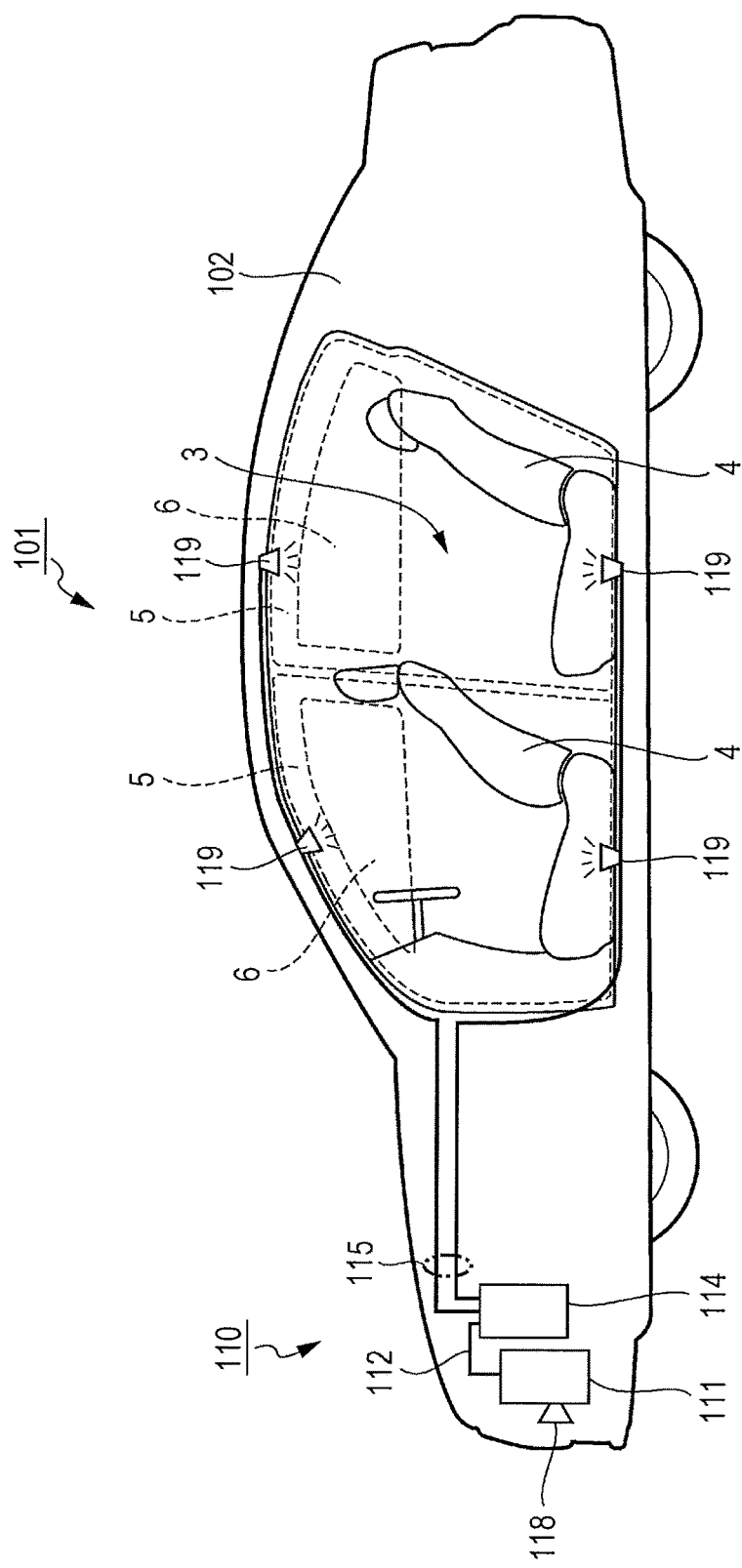
FIG. 1 is a partial transparent side view of the vehicle body of an automobile employing a cooling apparatus according to a first embodiment of the present invention.

FIG. 1 is a partial transparent side view of an automobile 101 employing a cooling apparatus according to a first embodiment of the present invention.

The automobile 101 in FIG. 1 includes a vehicle body 102. The central portion of the vehicle body 102 includes passenger space 3 that accommodates a user. Two rows of seats 4 where a user sits down are provided within the passenger space 3. A door panel 5 which the user opens/closes for boarding is provided to the side face of the passenger space 3 of the vehicle body 102. A window glass 6 is provided on the upper portion of the door panel 5 in a vertically movable manner. The user can sit in the seat 4 by opening/closing the door panel 5. The user can open/close the window glass 6 by operating an opening/closing switch provided in the inner side of the door panel 5.

The passenger space 3 becomes, in a state in which the door panel 5 and window glass 6 are closed, space isolated from the outside. With such passenger space 3, room temperature is significantly increased, for example, due to hot solar radiation in the summer or the like. Also, surface temperature of interior equipment such as the seats 4 and so forth is also increased, and accordingly, as for the user, the passenger space 3 has to rapidly be cooled.

With the common automobile 101, the user who has got into the vehicle operates an ignition key to start the engine, to activate an air conditioning apparatus, and to drive a compressor along therewith, and accordingly, a cooling cycle of the air conditioning apparatus is activated, and accordingly, the air in the passenger space 3 is cooled.

However, in the event of cooling the passenger space 3 using the air conditioning apparatus in this way, the air in the passenger space 3 is immediately cooled using heat-exchange equipment, and accordingly, it takes time until the passenger space 3 is cooled after the user's boarding. Therefore, with the present embodiment, a cooling apparatus 110 is employed that rapidly cools the passenger space by releasing the compressed air into the passenger space before a user who intends to get into the vehicle gets into the vehicle.

Figure 2:
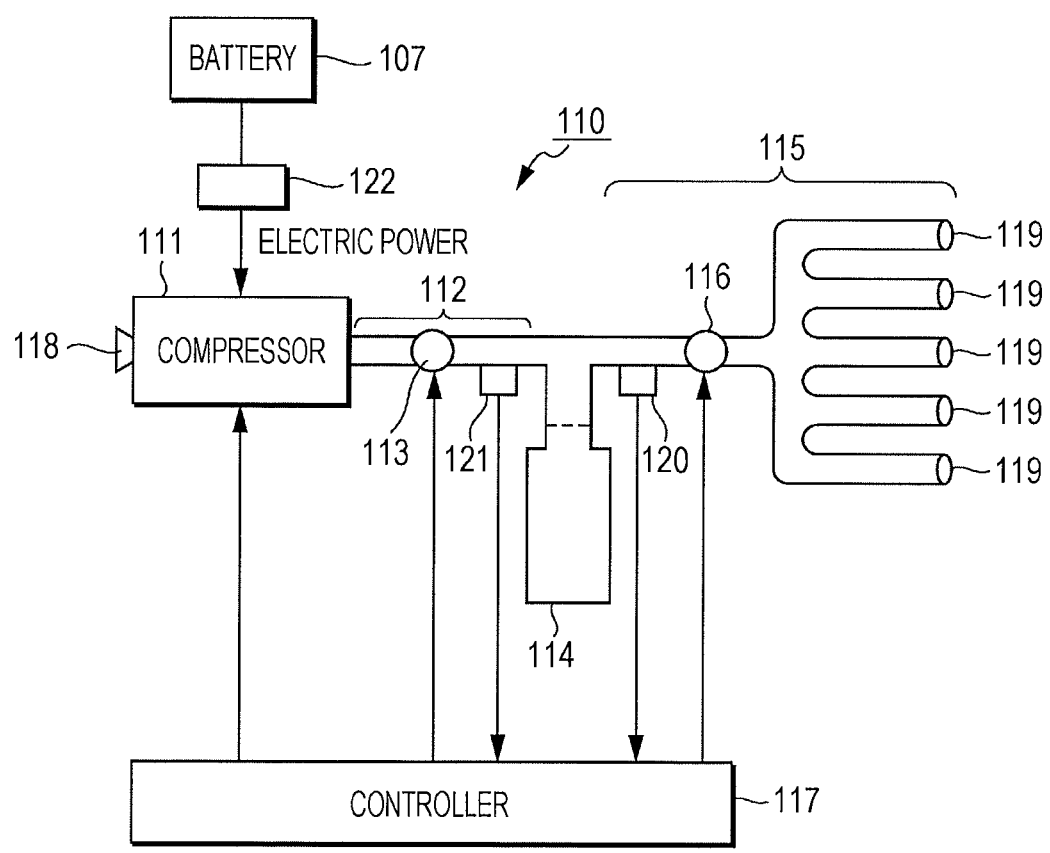
FIG. 2 is a configuration diagram of the cooling apparatus to be mounted on the automobile in FIG. 1.

FIG. 2 is a configuration diagram of the cooling apparatus 110 to be mounted on the automobile 101 in FIG. 1. With the cooling apparatus 110 in FIG. 2, the passenger space 3 is cooled by releasing the compressed air into the passenger space 3 in FIG. 1.

The cooling apparatus 110 includes a compressor 111, an air intake duct 112, an air intake valve 113, a tank 114, an discharge air duct 115, an discharge valve 116, and a controller 117. The cooling apparatus 110 includes a pressure sensor 120 to detect pressure of the compressed air in the tank 114, a temperature sensor 121 to detect temperature of the compressed air in the tank 114, and a passenger detector which are not illustrated in the drawing. In FIG. 1, the pressure sensor 120 and temperature sensor 121 are connected between the air intake valve 113 and discharge valve 116.

With the compressor 111, activation and stop are controlled by the controller 117, and the air is absorbed, compressed, and output during activation. The controller 117 may control the capabilities of the compressor 111 being activated.

As for the compressor 111, a capacity-type pump may be employed, for example. The capacity-type pump compresses fluid by performing an operation in which fluid such as the air is absorbed from an intake vent 118, and the capacity of the absorbed fluid is reduced. Examples of the capacity-type pump include a gear pump, a diaphragm pump, a piston pump, and a plunger pump. The gear pump compresses fluid by rotation. The diaphragm pump, piston pump, and plunger pump compress fluid by reciprocation. In the event of employing rotation driving force of the engine 7 as a source of power in this way, a capacity-type pump having the intake vent 118 having a backflow valve is suitable for the compressor 111. The capacity-type pump has a force, even when driving is stopped in the middle of compression, maintaining pressure thereof.

The cooling apparatus 110 according to the present embodiment directly releases the compressed air into the passenger space 3. In order to suppress contamination of the passenger space 3, it is desirable to employ an oil-less type as for the compressor 111. The compressed air in the cooling apparatus 110 may be supplied to the passenger space 3 by exchanging the cool air of the compressed air into anther air such as the external air by heat-exchange equipment instead of being released into the passenger space 3 without change.

The intake vent 118 of the compressor 111 may be provided to the passenger space 3 or may be provided out of the automobile 101 (out of the passenger space 3). In the event of absorbing the external air out of the passenger space 3, the compressor 111 may adjust absorption capacity according to running speed, or may absorb the external air during parking. Fluctuation of the atmospheric pressure of the external air suppresses excessive load from affecting the compressor 111. In the event of absorbing the inner air within the passenger space 3, the atmospheric pressure of the passenger space 3 decreases. Therefore, for example, in a state in which the air conditioning apparatus mounted on the automobile 101 is set to the external air introduction mode, the compressor 111 may absorb the inner air. The inner air is commonly adjusted with temperature and moisture by the air conditioning apparatus. The inner air suppresses, as compared to the external air, moisture in the air stored in the tank 114, cooling effects after re-releasing this air into the passenger space 3, and suppression effects of moisture increase can be expected.

The compressor 111 includes an electric motor, and uses charged power of a battery 7 mounted in the vehicle body 102. Therefore, as illustrated in FIG. 1, it is desirable to provide the compressor 111 to the engine room.

The compressor 111 may use generated power of a solar light panel to be mounted on the vehicle body 102 or commercial power of a household power supply. In particular, the compressor 111 is operated when the solar light panel is generating power, whereby the compressor 111 can be operated in accordance with a case where the passenger space 3 is warmed by solar light and needs cooling. The compressor 111 is connected to the battery 7 via a relay switch 122.

Note that in the event that the engine mounted on the vehicle body 102 may be driven during parking, the compressor 111 may employ rotation driving force of the engine as a source of power. In this case, there is provided an electromagnetic clutch between the output shaft of the engine and the input shaft of the compressor 111. The compressor 111 can be controlled by disengaging the electromagnetic clutch so as not to become load of the engine while the vehicle is moving.

Additionally, with the compressor 111, a battery to be mounted on the vehicle body 102, the power of the solar light panel, household power supply, or vibration of the vehicle body 102 such as vertical movement caused while the vehicle is moving may be employed as a source of power, for example. Also, the compressor 111 of the cooling apparatus 110 may be integral with a compressor of the air conditioning apparatus mounted on the vehicle.

The air intake duct 112 connects the compressor 111 and tank 114. The air compressed by the compressor 111 is supplied to the tank 114 via the air intake duct 112.

The air intake valve 113 is provided to the air intake duct 112. Opening/closing of the air intake valve 113 is controlled by the controller 117. In the event that the air intake valve 113 is in an opened state, the air compressed by the compressor 111 is supplied to the tank 114. In the event that the air intake valve 113 is in an closed state, the air intake duct 112 is blocked, and supply of the compressed air from the compressor 111 to the tank 114 is stopped. The compressed air does not flow backward from the tank 114 side to the compressor 111.

With the tank 114, the compressed air is stored. The tank 114 may be a metal type, for example, such as stainless or the like, or may be a product made from reinforced plastic. With the tanks 114 made from these materials, the compressed air can be stored with high pressure. For example, with a vehicle of which the passenger space is 4000 liters in capacity, the compressed air is stored in a 40-liter tank, and a control unit releases the compressed air equivalent to equal to the capacity of the passenger space which is lower in temperature than room temperature, and accordingly, the air of higher room temperature within the passenger space is extruded and expanded, and accordingly, the cooled compressed air is switched with the air in the passenger space, whereby the room temperature of the passenger space can be decreased. Therefore, though there is no particular restriction regarding the capacity and shape of the tank 114, the capacity of the tank may suitably be equal to or greater than the capacity of the passenger space. Also, instead of the air in the passenger space being switched with the expanded compressed air, high room temperature in the passenger space may be decreased by releasing little compressed air than the capacity of the passenger space into the passenger space. The larger the capacity of the tank 114 is, the large the compressed air can be stored.

There is no particular restriction regarding the capacity and shape of the tank 114. The tank 114 has to have a size and a shape whereby the tank 114 can be installed in free space in the vehicle. The greater the capacity of the tank 114, the greater the compressed air can be stored.

The tank 114 may be fixed to the automobile 101 or cooling apparatus 110, or may be detachable. In the case that the tank 114 is detachable, the tank 114 can be replaced. The tank 114 in which the compressed air is enclosed beforehand is attached, whereby the compressed air can be released into the passenger space 3 without using the compressor 111. Enclosing aroma oil or perfume in the tank 114 along with the compressed air allows odor eliminating within the vehicle to be expected.

The installation place of the tank 114 is not particularly restricted. The tank 114 may be installed in a suitable place based on the safety standard or the like needed for the automobile 101 or the like. In FIG. 1, the tank 114 is installed in the engine room. The tank 114 may be installed in cargo space or the passenger space 3. In the event of installing the tank 114 in the passenger space 3, the tank 114 has to be installed in a place where direct sunlight does not hit or a place where the temperature is prevented from increasing.

Note that the cooling apparatus 110 may include multiple tanks 114. The multiple tanks 114 may be tanks which independently store the compressed air and independently supply to the passenger space 3, or may be tanks in which the compressed air is supplied from one of the tanks 114 to the other tank 114.

For example, an arrangement may be made such that a reservoir tank having a large capacity is added between the air intake valve 113 and tank 114 in FIG. 2, the compressed air is first stored in this reservoir tank, and the compressed air is supplied to the tank 114 after releasing from the reservoir tank.

The discharge air duct 115 connects between the tank 114 and passenger space 3. The compressed air discharged from the tank 114 is supplied to the passenger space 3 of the automobile 101 through the discharge air duct 115.

An discharge vent 119 of the discharge air duct 115 is provided to the passenger space 3. The discharge vent 119 may have a nozzle shape. The discharge vent 119 has a nozzle shape, whereby the compressed air can be discharged to the passenger space 3 while maintaining pressure within the discharge air duct 115.

The locations, directions, and number of the discharge vents 119 do not have a particular restriction. The discharge vent of the air conditioning apparatus may be used as the discharge vent 119. However, the compressed air has not only an advantage of decreasing the temperature by being expanded, but also an advantage of decreasing surface temperature of an object on which the compressed air is sprayed. Therefore, it is desirable to provide the discharge vent 119 in the position and direction where the compressed air can directly be sprayed on a location such as a sheet, handle, dashboard, and so forth where the temperature increases, or a location with which the user directly comes into contact. For example, the discharge vent 119 may be provided downward as to a pillar or roof or the like.

In FIG. 1, a part of the multiple discharge vents 119 are provided downward as to the roof, and are installed so as to spray the compressed air to the seats 4. Also, the rest of the multiple discharge vents 119 are provided upward within the seats 4, and are installed so as to spray the compressed air from the seats 4 to the passenger space 3.

A discharge valve 116 is provided to the discharge air duct 115. Opening/closing of the discharge valve 116 is controlled by the controller 117. In the event that the discharge valve 116 is in a closed state, the discharge air duct 115 is blocked, and the compressed air within the tank 114 is pooled and stored within the tank 114. The discharge valve 16 is closed under the operation of the compressor 111, and accordingly, the air pressure within the tank 114 increases. In the event that the discharge valve 116 is in an opened state, the compressed air stored in the tank 114 is released into the passenger space 3.

The controller 117 is connected to the units of the cooling apparatus 110, such as the compressor 111, air intake valve 113, discharge valve 116, pressure sensor 120, and so forth. The controller 117 controls the cooling apparatus 110.

The cooling apparatus 110 compresses the air at the compressor 111, stores the compressed air in the tank 114, and releases the compressed air stored in the tank 114 into the passenger space 3. The compressed air released from the passenger space 3 is expanded at the passenger space 3, and according to an endothermic effect at the time of this distension, the air within the passenger space 3 is cooled. Also, a location where the compressed air has been sprayed is cooled.

Note that, with the controller 117, the tank 114 in which the compressed air is stored may be heated by a heater, or may be cooled by a thermistor. Thus, the temperature before releasing of the compressed air is adjusted, and the room temperature of the passenger space 3 after the compressed air is released can be adjusted.

The controller 117 includes memory in which a control program is stored, and a central processing unit which executes the control program. The controller 117 may be an independent controller 117, may be realized as a part of an ECU (Engine Control Unit) which controls the engine of the automobile 101, or may be realized by a controller of the air conditioning apparatus.

In order to obtain various types of information to be used for control processing or determination, a running control signal of the vehicle, and various types of detection signals are input to the controller 117. Examples of such signals include a detection signal of the state of the ignition key, an activation signal or stop signal of the engine, a speed pulse signal, a brake operation signal, a remote control open/close key detection signal, and an unlocking signal or locking signal of the door panel 5. Additionally, there is a detection signal of an external temperature sensor, inner temperature sensor, or sunshine sensor. Of these running control signal and detection signals, there is a signal to be used as a passenger detector to detect whether or not there is a passenger in the passenger space 3. According to such information, the controller 117 determines whether there is a user in the passenger space. The passenger detector may employ an infrared sensor or camera other than these running control signal and detection signals, or may employ an existing door opening/closing recognition system or sheet internal pressure sensor.

Note that the controller 117 may include a timer to measure point-in-time and time, a wireless communication unit which communicates with a cellular phone or the like, and so forth.

Figure 3:
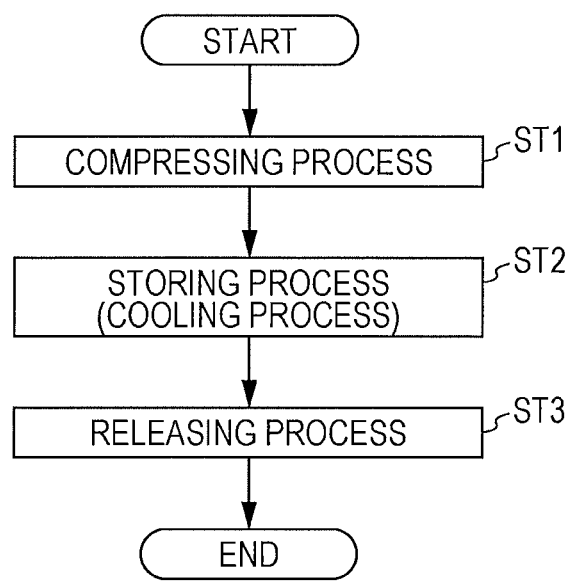
FIG. 3 is a flowchart of control for cooling by way of the controller in FIGS. 2, 7, and 10.

Next, the operation of the cooling apparatus 110 in FIG. 2 will be described. FIG. 3 is a flowchart illustrating the entirety of a cooling process of the cooling apparatus 110 in FIG. 2.

With the overall control in FIG. 3, the controller 117 of the cooling apparatus 110 first executes an air compressing process (step ST1).

In the event of having determined that there is no passenger in the passenger space 3 during parking or according to the information of the passenger detector, the controller 117 executes the air compressing process.

With the compressing process, in a state in which the air intake valve 115 is opened, and the discharge valve 116 is closed, the controller 117 operates the compressor 111 to supply the compressed air to the tank 114. The controller 117 closes the relay switch 122.

The controller 117 may determine, based on the detection signal of the pressure sensor 120 which detects the pressure of the tank 114, and a flag indicating the cycle of the cooling apparatus 110 stored in memory, whether or not there is the compressed air in the tank 114, and in the event that no compressed air is stored, operate the compressor 111.

In the event that the pressure of the pressure sensor 20 has reached equal to or greater than a reference value, the controller 117 stops the compressor 111, and closes the air intake valve 113. The controller 117 opens the relay switch 122.

Thus, the air intake valve 113 and discharge valve 116 both become a closed state, and the compressed air having pressure equal to or greater than a reference value is stored in the tank 114 (storing process, cooling process, step ST2).

Note that predetermined reference pressure for stopping storage of the compressed air as to the tank 114 has to be higher than the atmospheric pressure, and is several Mpa, for example.

Incidentally, the air generates heat when compressed. The compressed air stored in the tank 114 is cooled along with the tank 114 after completion of compression. For example, in the event that the tank 114 does not have a heat-insulated configuration, temperature of the compressed air is cooled up to the same temperature as the external temperature of the tank 114. Accordingly, with the storing process after the compressed air is supplied to this tank 114, the temperature of the passenger space within the tank 114 is cooled to normal temperature, for example.

Next, the controller 117 executes a releasing process (step ST3).

The controller 117 executes the releasing process, for example, when the user gets into the vehicle, after the user gets into the vehicle, or in the event that determination is made that the user is likely to get into the vehicle, based on information from the passenger detector.

With the releasing process, the controller 117 opens the discharge valve 116 while keeping the air intake valve 113 open. Thus, the compressed air stored in the tank 114 is discharged to the passenger space 3 through an discharge nozzle. The compressed air is expanded within the passenger space 3, and the room temperature in the boarding case 3 is decreased by endothermic reaction accompanied with expansion.

Note that, with this releasing process, in order to suppress pressure increase in the passenger space 3, the controller 117 may execute control to open the window glass 6 together, or may control the air conditioning apparatus in accordance with the external air introduction mode. The controller 117 has to start releasing of the compressed air in a state in which a vent hole is provided to the passenger space 3 in this way. The controller 117 has to detect that the window glass 6 or door panel 5 is opened to start releasing of the compressed air.

As described above, in order to release the compressed air into the passenger space 3, the controller 117 executes the compressing process, storing process, and releasing process as one-time cooling cycle. Thus, the room temperature of the passenger space 3 after releasing decreases as compared to before releasing.

The cooling apparatus 110 can cool the passenger space 3. The controller 117 repeatedly executes the cooling cycle, whereby the passenger space 3 can be cooled over multiple times.

Also, with the cooling apparatus 110 according to the present embodiment, instead of releasing into the passenger space 3 immediately after compressing the air, the compressed air passes through the storing process.

According to passing through a cooling period in this storing process, the temperature in the compressed air decreases as compared to the temperature at the time of completion of compression, and becomes normal temperature, for example.

The compressed air of which the temperature has been lowered is released into the passenger space 3, whereby more room temperature lowering can be expected as compared to a case where the high-temperature compressed air immediately after compression is released. Also, the controller 117 executes the compressing process during parking where the user gets out.

On the other hand, in the event of carrying out the compressing process under the user's boarding, the compressor 111 is driven by the driving force of the engine, and accordingly, for example, increase in idling, and increase in engine load may be sensed by the user. With the present embodiment, there is no such concern.

Second Embodiment

The first embodiment is an example of the basic configuration and operation of the cooling apparatus 110 which cools the passenger space 3 using the compressed air. A second embodiment is an example in which the compressing process of the cooling apparatus 110 according to the first embodiment has been improved so as to suitably carry out the compressing processing during parking. The configurations of the vehicle and cooling apparatus 110 according to the second embodiment are the same configurations as those in the first embodiment.

Figure 4:
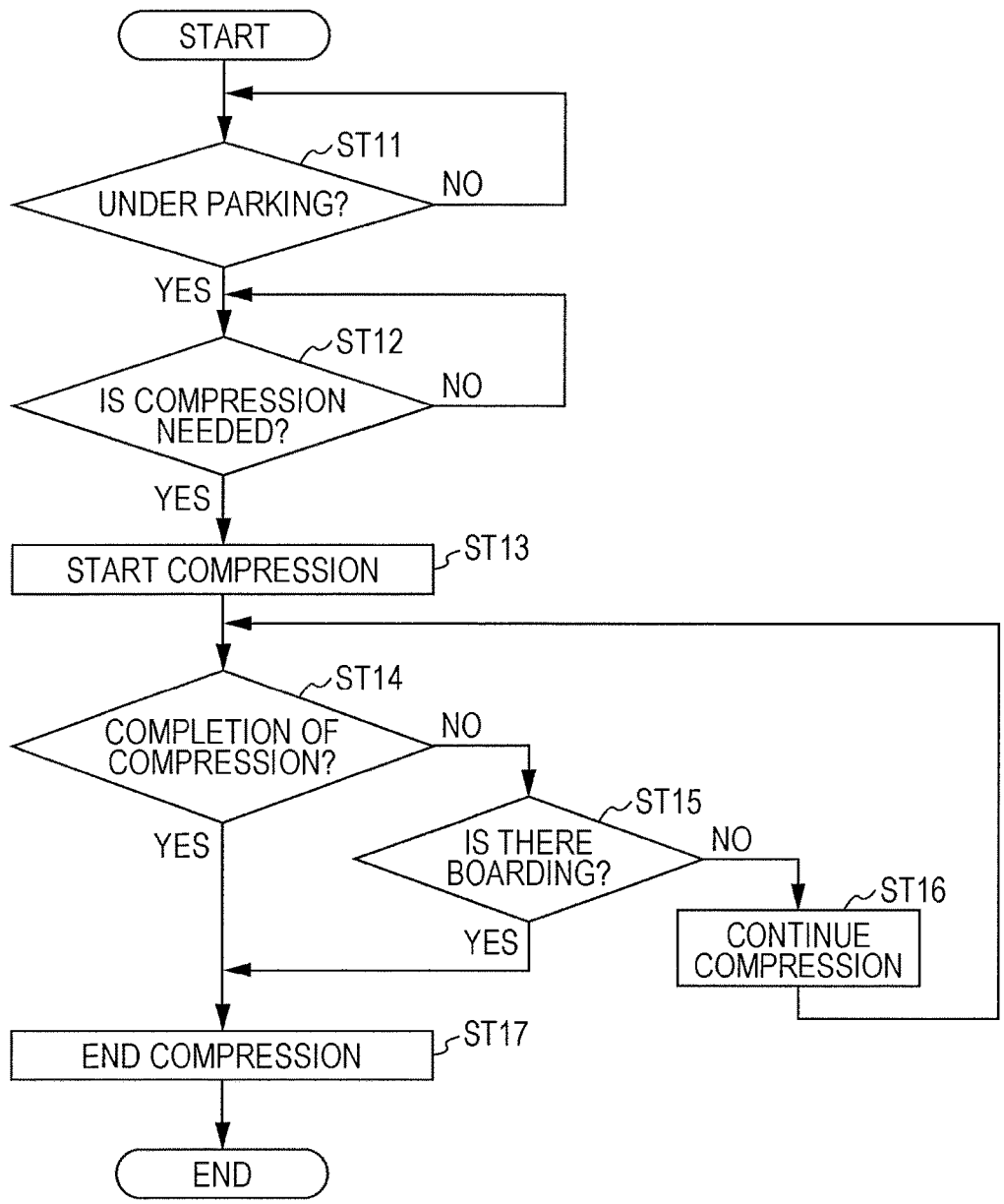
FIG. 4 is a flowchart of a compressing process of a cooling apparatus according to a second embodiment of the present invention.

FIG. 4 is a flowchart of the compressing process of the cooling apparatus 110 according to the second embodiment of the present invention.

As illustrated in FIG. 4, with the compressing process, the controller 117 first determines whether or not the vehicle is under parking (step ST11).

The controller 117 determines whether or not the vehicle is under parking, for example, by determining that the vehicle is stopped in a state in which no user gets into the vehicle.

Whether or not the vehicle is under parking in a state in which no user is in the vehicle can be determined by determining whether or not there is a detection signal from a sensor for detecting opening/closing of the door panel 5, and whether or not the engine is stopped. In the event that opening/closing of the door panel 5 has been detected after the engine is stopped, determination can be made that the user has got off in a state in which the vehicle body 102 has been stopped.

In the event that determination is made that the vehicle is under parking, the controller 117 determines whether the compressing process has to be carried out (step ST12). In the event that the compressed air has already stored in the tank 114, the compressing process is not needed.

The controller 117 determines whether or not a detection signal of the pressure sensor 120 exceeds a predetermined reference value, for example. In the event that the detection signal does not exceed the predetermined reference value, the controller 117 determines that the compressing process has to be carried out.

In the event that determination is made that the compressing process has to be carried out, the controller 117 starts the compressing process (step ST13).

The controller 117 activates the compressor 111 under the same control as with the first embodiment. Also, the controller 117 connects the electromagnetic clutch. Thus, the compressor 111 starts a compressing operation. The air compressed by the compressor 111 is supplied to the tank 114.

After starting the compressing process, the controller 117 determines completion of the compressing process (step ST14). In the event that the internal pressure of the tank 114 is equal to or greater than a predetermined value, the controller 117 determines this to be completion of the compressing process. In the event that the internal pressure of the tank 114 has not reached the predetermined value, the controller 117 determines this to be incompletion of the compressing process.

In the event that determination is made that the compressing process has not been completed, the controller 117 further determines whether or not the user has got into the vehicle (step ST15). The controller 117 has to determine whether or not the user has got into the vehicle, based on whether or not there is opening/closing of the door panel 5 or whether or not the engine has been activated.

In the event that determination is made that the compressing process has not been completed, and also the user has not got into the vehicle, the controller 117 continues the compressing process (step ST16).

The controller 117 has continued the compressing operation by the compressor 111. The controller 117 repeats the above-mentioned control until the compressed air of which the pressure is equal to or greater than a reference value is stored in the tank 114, and the compressing process is determined to have been completed, or until determination is made that the user has got off the vehicle. During this, the controller 117 continues to determine that the compressing process has to be continued.

Upon the compressed air of which the pressure is equal to or greater than a reference value being stored in the tank 114, the controller 117 determines completion of the compressing process (step ST14).

The controller 117 ends the compressing process under the same control as with the first embodiment (step ST17).

The controller 117 opens the relay switch 122 to stop power feeding for the compressor 111. Thus, the compressed air of which the predetermined pressure is equal to or greater than a reference value has been stored in the tank 114.

Also, in the event that determination is made in step ST15 that the user has got into the vehicle as well, the controller 117 ends the compressing process (step ST17). The controller 117 opens the relay switch 122 to stop power feeding for the compressor 111 under the same control as with the first embodiment.

Compression is ended in accordance with the user having got off the vehicle in state in which compression has not been completed in this way, whereby, with a period in which the user uses the battery 107 and engine, the compressor 111 can be suppressed from becoming load for these.

Figure 5:
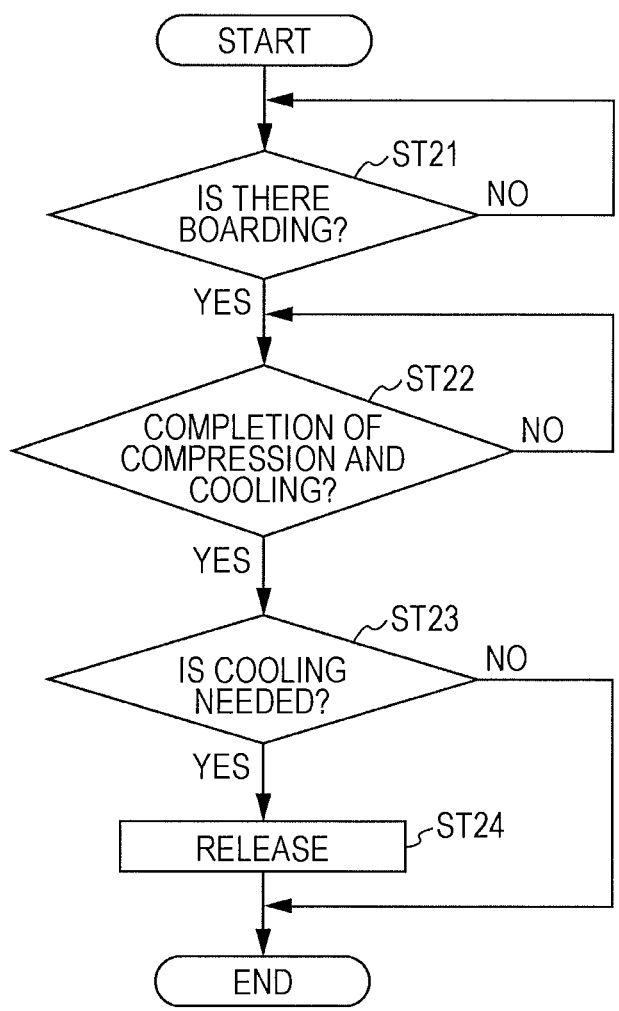
FIG. 5 is a flowchart of a releasing process to be combined with the compressing process in FIG. 4.

FIG. 5 is a flowchart of the releasing process suitably combined with the compressing process in FIG. 4. As illustrated in FIG. 5, with the releasing process, the controller 117 first determines whether or not this timing is timing for carrying out the releasing process. With the example in FIG. 5, the controller 117 first determines whether or not there is boarding (step ST21). Whether or not there is boarding can be determined by determining whether or not there is a detection signal of the sensor for detecting opening/closing of the door panel 5, or whether or not the engine has been stared. In the event that the engine has been started after opening/closing of the door panel 5 is detected, determination can be made that the user has got into the vehicle.

In the event that determination is made that the user has got into the vehicle, the controller 117 determines whether or not the compressing process and cooling process (storing process) have been completed (step ST22).

For example, in the event that a detection signal of the pressure sensor 120 of the tank 114 exceeds a predetermined reference value, the controller 117 determines that the compressing process has been completed. In addition to this, for example, an arrangement may be made such that in the event that determination is made in step ST14 in FIG. 4 that the compressing process has been completed, the controller 117 stores a completion flag in the memory, and determine that the compressing process has been completed by confirming this completion flag.

For example, in the event that the detection signal of the temperature sensor 121 of the tank 114 is less than the predetermined reference value, the controller 117 determines that the cooling process has been completed. In addition to this, for example, an arrangement may be made such that when determination is made in step ST14 in FIG. 4 that the compressing process has been completed, the controller 117 sets cooling time in a timer, and determines that the cooling process has been completed by confirming that this cooling time has elapsed.

In the event that determination is made that the compressing process and cooling process (storing process) have been completed, the controller 117 determines whether or not cooling using the compressed air is needed (step ST23).

For example, in the event that detection temperature of an internal temperature sensor within the passenger space 3 is equal to or greater than an external temperature or predetermined temperature, for example, such as 20 degrees or the like, the controller 117 determines that cooling using the compressed air is needed. In addition to this, for example, an arrangement may be made such that in the event that detection temperature of an external temperature sensor is equal to or greater than a predetermined temperature, or in the event that a sunlight sensor has detected sunlight amount equal to or greater than a predetermined value, the controller 117 determines that cooling using the compressed air is needed. Further, additionally, for example, the controller 117 may determine whether or not cooling using the compressed air is needed, based on whether or not there is activation reserved point-in-time of the timer, elapsed time since the user got off the vehicle last time, or whether or not there is an activation instruction form a cellular phone or the like.

In the event that this timing is timing for carrying out the releasing process, and also cooling is needed, the controller 117 carries out the releasing process (step ST24).

The controller 117 opens the discharge valve 116 under the same control as with the first embodiment. Thus, the compressed air in the tank 114 is released into the passenger space 3.

Note that, in FIG. 5, the determination step ST23 of whether or not cooling using the compressed air is needed is positioned after the determination steps ST21 and ST22 of the executing timing of the releasing process. The determination step ST23 of whether or not cooling using the compressed air is needed may be carried out before the determination steps ST21 and ST22 of the executing timing of the releasing process.

In the event of performing cooling based on the activation reserved point-in-time of the timer, or an activation instruction from a cellular phone or the like, the controller 117 may execute cooling by confirming only that the compressing process and cooling process have been completed, without determining whether or not the user has got into the vehicle.

As described above, the controller 117 carries out the compressing process and cooling process during parking, and carries out the necessary releasing process at the user's boarding timing. As a result thereof, the controller 117 can release the compressed air stored during parking at the time of boarding. Moreover, the controller 117 performs control, instead of enabling releasing immediately after completion of storing of the compressed air during parking, so as not to perform releasing unless a certain cooling process (storing process) is carried out.

Therefore, a period for reliable heat liberation can be ensured as a storing cooling period of the compressed air in the tank 114. The compressed air of which the temperature has been lowered by the heat liberation period for reliable heat liberation is released into the passenger space 3, more room temperature lowering can be expected as compared to a case where the high-temperature compressed air immediately after compression is released.

Also, upon the user having got into the vehicle during compression, the controller 117 stops compression. Thus, the user is prevented from detecting the compression operation.

Even in the event that the user frequently repeats getting in/off, the air having generally certain pressure can be compressed in the tank 114 by connecting divided parking periods thereof. Moreover, the controller 117 carries out the releasing process only after the air is cooled in the storing process after the compressing process.

As a result thereof, in the event that the user frequently repeats getting in/off, the compressed air insufficiently cooled during thereof can be prevented for releasing into the passenger space 3. That is to say, unnecessary room temperature increase can be prevented by the compressed air in such an insufficient cooling state being released into the passenger space 3.

Though the above-mentioned embodiment is an example of a suitable embodiment of the present invention, the present invention is not restricted to this, and various modifications and changes can be made without departing from the essence of the present invention.

With the above-mentioned embodiment, the cooling apparatus 110 is mounted on the automobile 110. In addition to this, for example, the cooling apparatus 101 may be mounted on another vehicle such as a bus, train, or the like.

The cooling apparatus 110 may be formed as an independent apparatus separated from the vehicle.

An electric motor is employed as a driving source of the compressor 111, whereby the cooling apparatus 110 can carry out the compressing process without employing the driving force of the engine as the driving source. The cooling apparatus 110 employing an electric compressor can be operated by the power of the battery 7 of the vehicle, solar light generating power panel, and household power supply.

The cooling apparatus 110 is configured so as to be portable, whereby this can be used for cooling multiple vehicles. The cooling apparatus 110 can also be used as a cooling apparatus 110 for emergency use.

With the above-mentioned embodiment, the cooling apparatus 110 includes the compressor 111 in addition to the tank 114. In addition to this, for example, the cooling apparatus 110 may be configured so as not to include the compressor 111 by the tank 114 being configured so as to be replaceable. In this case, the cooling apparatus 110 does not carry out the compressing process. Also, the cooling apparatus 110 has to carry out the cooling process by confirming the remaining pressure of the tank 114, or by confirming whether or not a new tank 114 has been mounted. In the event of purchasing the tank 114, the tank 114 thereof is generally cooled with normal temperature, and accordingly, the storing process for cooling is also not needed.

With the above-mentioned embodiment, the passenger space 3 of the vehicle such as the automobile 101 or the like is cooled by the cooling apparatus 110. The vehicle such as the automobile 101 or the like commonly includes the air conditioning apparatus in which a cooling medium is circulated by a compressor, a condenser, a receiver, an expansion valve, and an evaporator, the passenger space 3 is cooled by spraying the air of the passenger space 3 on the evaporator by a blower fan.

In addition to this, for example, the passenger space 3 of the vehicle such as the automobile 101 or the like may be cooled by the cooling apparatus 110 and air conditioning apparatus. For example, after performing initial cooling at the cooling apparatus 110, the passenger space 3 may be cooled to a desirable temperature at the air conditioning apparatus. Thus, the passenger space 3 is cooled in a surely shorter period of time than a case where the passenger space 3 is cooled by the air conditioning apparatus alone.

Note that such a coordination cooling operation between the cooling apparatus 110 and the air conditioning apparatus can be realized, in the event that these controllers are separately provided, by transmitting an activation signal from the cooling apparatus 110 to the air conditioning apparatus, for example.

In the case of the controller is shared, this coordination cooling operation can be realized by communicating from a control program of the cooling apparatus 110 to a control program of the air conditioning apparatus using program-to-program communication according to a flag or the like.

Third Embodiment

Figure 6:
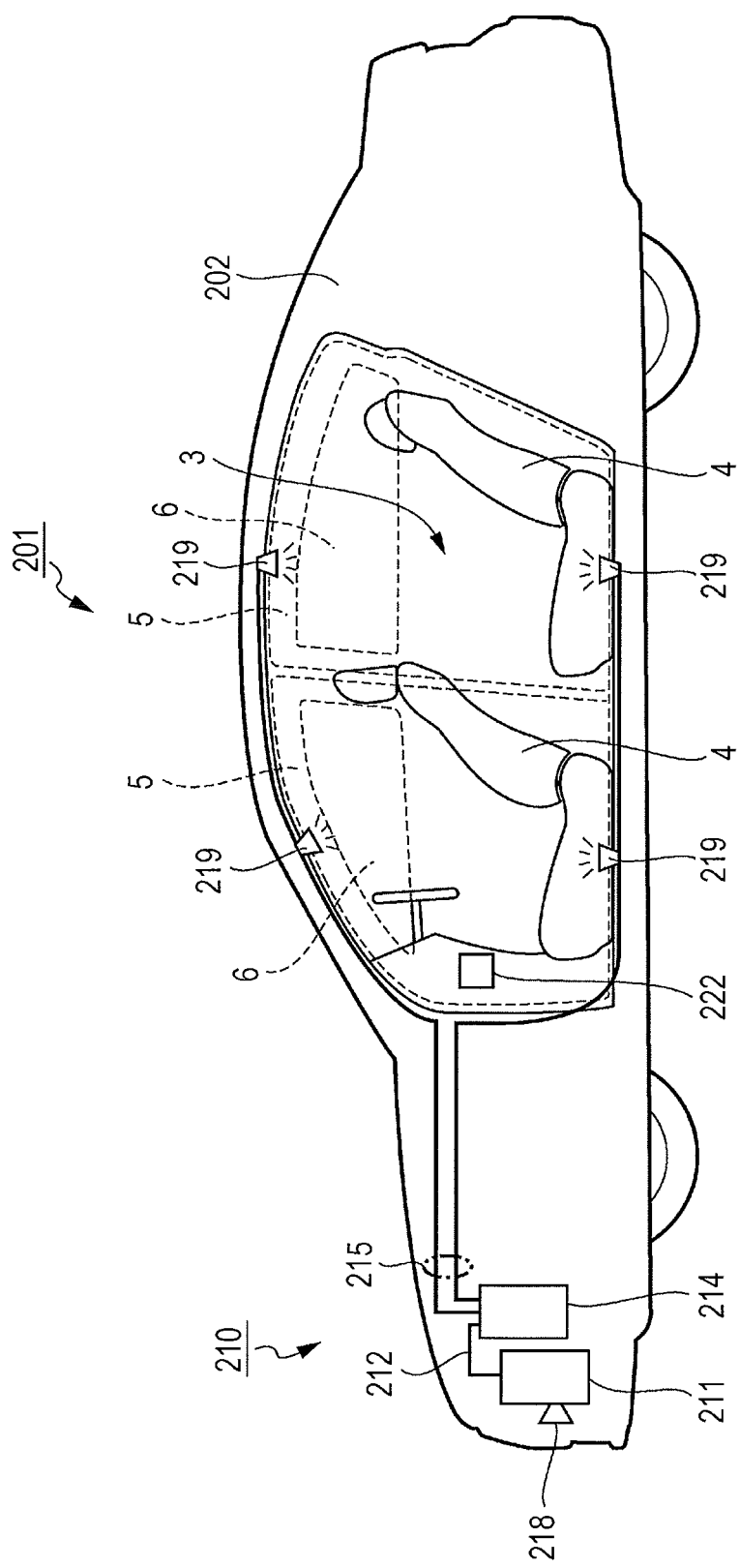
FIG. 6 is a partial transparent side view of the vehicle body of an automobile employing a cooling apparatus according to a third embodiment of the present invention.

FIG. 6 is a partial transparent side view of an automobile 201 employing a cooling apparatus 210 according to a third embodiment of the present invention. Note that description will be omitted regarding the same contents as with the first embodiment.

The automobile 201 in FIG. 6 includes a vehicle body 202. With the present embodiment, the cooling apparatus 210 is employed in which before the user who intends to get into the vehicle gets into the vehicle, the compressed air is released into the passenger space, thereby rapidly cooling the passenger space.

Figure 7:
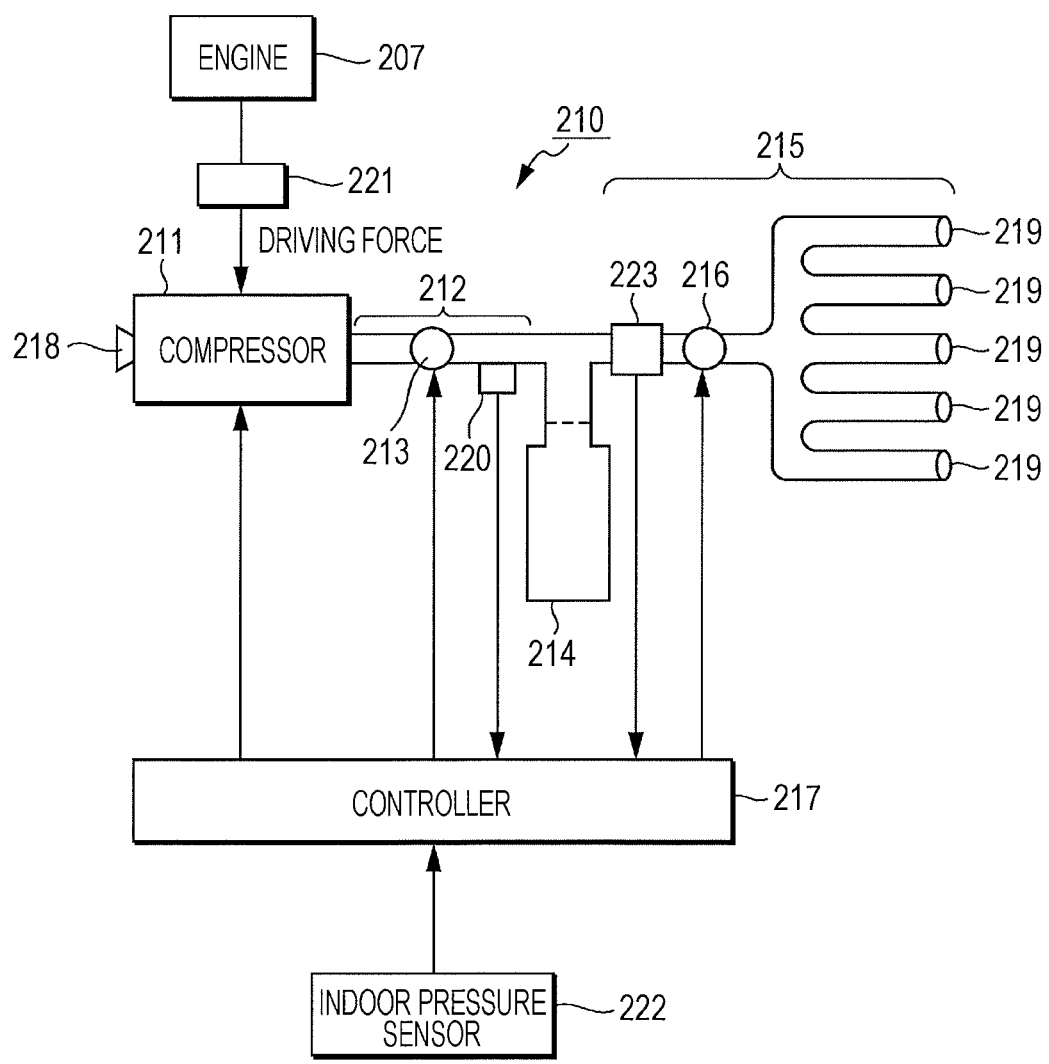
FIG. 7 is a configuration diagram of the cooling apparatus to be mounted on the automobile in FIG. 6.

FIG. 7 is a configuration diagram of the cooling apparatus 210 to be mounted on the automobile 201 in FIG. 6. The cooling apparatus 210 in FIG. 7 cools the passenger space 3 by releasing the compressed air into the passenger space 3 in FIG. 6.

The cooling apparatus 210 includes a compressor 211, an air intake duct 212, an air intake valve 213, a tank 214, an discharge air duct 215, an discharge valve 216, and a controller 217. The cooling apparatus 210 includes a tank pressure sensor 220 which detects the pressure of the compressed air of the tank 214, and an in-room pressure sensor 222 which detects the pressure of the passenger space.

The configurations of the cooling apparatus 201, compressor 211, air intake duct 212, air intake valve 213, tank 214, discharge air duct 215, discharge valve 216, controller 217, intake vent 218, and discharge vent 219 are basically the same as those in the first embodiment. Description will be omitted regarding the same configurations as with the first embodiment.

The compressor 211 can use the rotation driving force of the engine 7 to be mounted on the vehicle body 202 as a source of power. Therefore, as illustrated in FIG. 6, the compressor 211 has to be provided in the engine room. In this case, an electromagnetic clutch 221 is provided between the output shaft of the engine 7 and the input shaft of the compressor 211. The compressor 211 can be stopped during operation of the engine 7 by disengaging the electromagnetic clutch 221.

With the tank 214, the compressed air is stored. The tank 214 may be a metal type, for example, such as stainless or the like, or may be a product made from reinforced plastic. With the tanks 214 made from these materials, the compressed air can be stored with high pressure.

Note that the cooling apparatus 210 may include multiple tanks 214. The multiple tanks 214 may be tanks which independently store the compressed air and independently supply to the passenger space 3, or may be tanks in which the compressed air is supplied from one of the tanks 214 to the other tank 214.

For example, an arrangement may be made such that a reservoir tank having a large capacity is added between the air intake valve 213 and tank 214 in FIG. 6, the compressed air is first stored in this reservoir tank, and the compressed air is supplied to the tank 214 after releasing from the reservoir tank.

The discharge valve 216 is provided to the discharge air duct 215. Opening/closing of the discharge valve 216 is controlled by the controller 217. Releasing amount of the compressed air stored in the tank 214 can be adjusted by adjusting the open degree of the discharge valve 216.

Also, with the present embodiment, a flow rate sensor 223 is provided to the discharge air duct 215 between the tank 214 and the discharge valve 216. Examples of the flow rate sensor 223 include a venturi type, an orifice type, a heat ray type, a Kalman type, a turbine type, and impeller type. In the event of taking vibration of the vehicle body 202 into consideration, an orifice type or a heat ray type flow rate sensor is suitable. The flow rate sensor 223 outputs an signal indicating the detected flow rate to the controller 217.

The tank pressure sensor 220 is, as illustrated in FIG. 7 for example, provided between the air intake valve 213 and the discharge valve 216. In addition to this, the tank pressure sensor 220 may be provided to the tank 214. Thus, the tank pressure sensor 220 can detect the pressure of the tank 214.

The in-room pressure sensor 222 is, as illustrated in FIG. 6 for example, provided within a dashboard. The in-room pressure sensor 222 may be provided to a place other than this, in the passenger space 3. Thus, the in-room pressure sensor 222 can detect the pressure of the passenger space 3. The tank pressure sensor 220 or in-room pressure sensor 222 may be either a diaphragm type pressure sensor or barrier membrane type pressure sensor. However, with the present embodiment, difference between the detection pressure of the tank pressure sensor 220 and the detection pressure of the in-room pressure sensor 222 is used, and accordingly, the same type has to be employed. Thus, the pressure sensors can be used for control even in the event of strictly proofing the sensitivity and so forth of each pressure sensor.

In order to obtain various types of information to be used for control processing or determination, a running control signal of the vehicle, and various types of detection signals are input to the controller 217. Examples of such signals include the detection signals of the tank pressure sensor 220, in-room pressure sensor 222, external temperature sensor, inner temperature sensor, and a sunlight sensor. In addition to these, there are a detection signal of the state of the ignition key, an activation signal or stop signal of the engine 7, a speed pulse signal, a brake operation signal, a detection signal of a remote control open/close key, and an unlocking signal or locking signal of the door panel 5.

Note that the controller 217 may include a timer to measure point-in-time and time, a wireless communication unit which communicates with a cellular phone or the like, and so forth.

Next, the operation of the cooling apparatus 210 in FIG. 7 will be described. FIG. 3 is a flowchart illustrating the entirety of a cooling process of the cooling apparatus 210 in FIG. 7.

With the overall control in FIG. 3, the controller 217 of the cooling apparatus 210 first executes an air compressing process (step ST1).

The controller 217 executes, after the user gets into the vehicle and starts the engines 7 for example, the compressing process.

In the event that the pressure of the tank pressure sensor 220 has reached equal to or greater than a reference value, the controller 217 stops the compressor 211, and closes the air intake valve 213. In the event of employing the electromagnetic clutch 221, the controller 217 blocks this. Thus, the air intake valve 213 and discharge valve 216 both become a closed state, and the compressed air having certain pressure equal to or greater than a reference value is stored in the tank 214 (storing process, step ST2).

Next, the controller 217 executes the releasing process (step ST3).

The controller 217 starts the releasing process, for example, when the user gets into the vehicle. In this case, the controller 217 executes the releasing process at the time of boarding each time the user gets into the vehicle, and then executes the compressing process.

With the releasing process, the controller 217 opens the discharge valve 216 while keeping open the air intake valve 213. The controller 217 releases the high-pressure compressed air from the tank 214 before the user gets into the vehicle, and releases, after the user gets into the vehicle, the low-pressure compressed air remaining in the tank 214 after the high-pressure compressed air is released.

It can be determined, for example, using a proximity detection signal of a smart key which the user carries, or an activation signal of the engine 7 from an engine starter which the user carries whether or not the user has yet to get into the vehicle.

It can be determined, for example, using an open detection signal of the door panel 5, a detection signal of a seat sensor embedded in the seats 4, or a detection signal of a seat belt wearing sensor whether or not the user has got into the vehicle. For example, an arrangement may be made such that these signals are received by an ECU, and a notification signal is output from the ECU to the controller 217. Thus, the compressed air stored in the tank 214 is discharged to the passenger space 3 through the discharge nozzle. The compressed air is expanded within the passenger space 3, and the room temperature of the passenger space 3 is lowered by endothermic reaction accompanied with expansion.

Note that, with this releasing process, in order to suppress pressure increase of the passenger space 3, the controller 217 may execute control for opening the window glass 6 together. Alternatively, the controller 217 may control the air conditioning apparatus in accordance with the external air introduction mode. The controller 217 has to start releasing of the compressed air in a state in which a vent hole is provided to the passenger space 3 in this way. The controller 217 may start releasing of the compressed air by detecting the window glass 6 or door panel 5 being opened.

Also, with the releasing process, the controller 217 releases the high-pressure compressed air from the tank 214 before the user gets into the vehicle, and after the user gets into the vehicle, releases the low-pressure compressed air remaining in the tank 214 after the high-pressure compressed air is released.

Thus, the compressed air stored in the tank 214 is released into the passenger space 3 before and after the user's boarding. Also, the compressed air stored in the tank 214 is released in stages such that releasing from the tank 214 is started before the user gets into the vehicle, and releasing from the tank 214 is ended after the user gets into the vehicle.

Accordingly, with the present embodiment, according to a cooling effect accompanied with expansion of the high-pressure compressed air released before the user's boarding, or the like, the passenger space 3 can be cooled before the user's boarding, and further, according to the wind of the low-pressure compressed air released after the user's boarding, the user himself/herself who has got into the vehicle can be cooled.

Fourth Embodiment

The third embodiment is an example of the basic configuration and operation of the cooling apparatus 210 which cools the passenger space 3 using the compressed air. A fourth embodiment is an example of the releasing process of the cooling apparatus 210 according to the third embodiment having been improved. The configurations of the vehicle and cooling apparatus 210 in the fourth embodiment are the same as those in the third embodiment.

Figure 8:
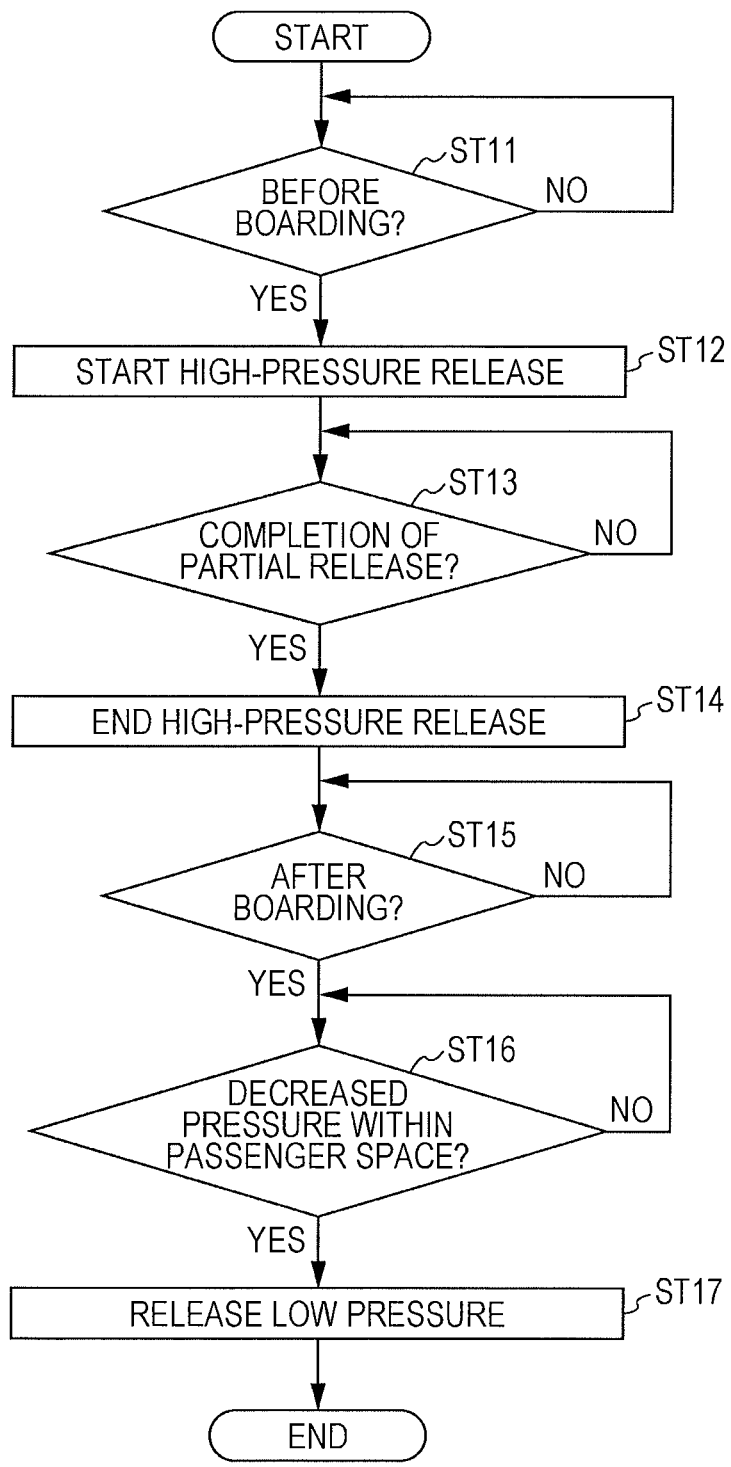
FIG. 8 is a flowchart of a releasing process according to a fourth embodiment of the present invention.

FIG. 8 is a flowchart of the releasing process of the cooling apparatus 210 according to the second embodiment of the present invention. As illustrated in FIG. 8, with the releasing process of the compressed air, the controller 217 first determines whether or not the user has yet to get into the vehicle (step ST11).

It can be determined, for example, using a proximity detection signal of a smart key which the user carries, or an activation signal of the engine 7 from an engine starter which the user carries whether or not the user has yet to get into the vehicle.

Upon detecting that the user is going to get into the vehicle, the controller 217 starts releasing of the high-pressure compressed air (step ST12).

The controller 217 fully opens the discharge valve 216 while closing the air intake valve 213.

With releasing of this high-pressure compressed air, part of the compressed air stored in the tank 214 is released.

Therefore, the controller 217 determines whether or not partial releasing of the compressed air has been completed (step ST13).

As for part of the compressed air stored in the tank 214, 70% or more of the compressed air stored in the tank 214 may be preferable, for example.

Releasing amount of the compressed air from the tank 214 may be obtained by adding a flow rate detected by the flow rate sensor 223, or may be obtained by detection pressure of the tank pressure sensor 220.

In the event that partial releasing of the compressed air has been completed, the controller 217 ends releasing of the high-pressure compressed air (step ST14). The controller 217 also closes the discharge valve 216.

In the event that partial releasing of the compressed air has not been completed, the controller 217 repeats the determination processing in step ST13 while continuing releasing of the high-pressure compressed air.

Upon partial releasing of the compressed air being completed, the controller 217 then ends releasing of the high-pressure compressed air (step ST14).

Upon partial releasing of the high-pressure compressed air being ended, the controller 217 proceeds to releasing processing of the low-pressure compressed air.

The controller 217 determines whether or not the user has got into the vehicle (step ST15).

It can be determined, for example, using an open detection signal of the door panel 5, a detection signal of a seat sensor embedded in the seats 4, or a detection signal of a seat belt wearing sensor whether or not the user has got into the vehicle.

Upon the user having got into the vehicle, the controller 217 further determines whether or not the pressure of the passenger space 3 has been lowered (step ST16). The pressure of the passenger space 3 can bed detected by the in-room pressure sensor 222.

For example, in the event that the pressure of the passenger space 3 is lowered up to the atmospheric pressure or so, the controller 217 starts releasing of the low-pressure compressed air remaining in the tank 214 (step ST17).

The controller 217 opens the discharge valve 216 so as to adjust the open degree of the discharge valve 216, for example, so that the detection value of the flow rate sensor 223 becomes a certain reference value.

Also, for example, upon releasing the low-pressure compressed air for a certain period of time, the controller 217 ends releasing of the low-pressure compressed air. The controller 217 closes the discharge valve 216.

As described above, the controller 217 releases the compressed air before and after the user gets into the vehicle.

Also, the controller 217 releases the low-pressure compressed air remaining in the tank 214 after the user gets into the vehicle, and further, the pressure of the passenger space 3 is lowered.

Accordingly, the wind can be applied to the user who has got into the vehicle under the lowered pressure of the passenger space 3.

In particular, with the present embodiment, at the time of releasing the low-pressure compressed air remaining in the tank 214, the open degree of the discharge valve 216 is adjusted so as to obtain a constant flow rate. Thus, wind of a comfortable wind amount can be applied to the user.

Though the above-mentioned embodiment is an example of a suitable embodiment of the present invention, the present invention is not restricted to this, and various modifications and changes can be made without departing from the essence of the present invention.

Fifth Embodiment

Figure 9:
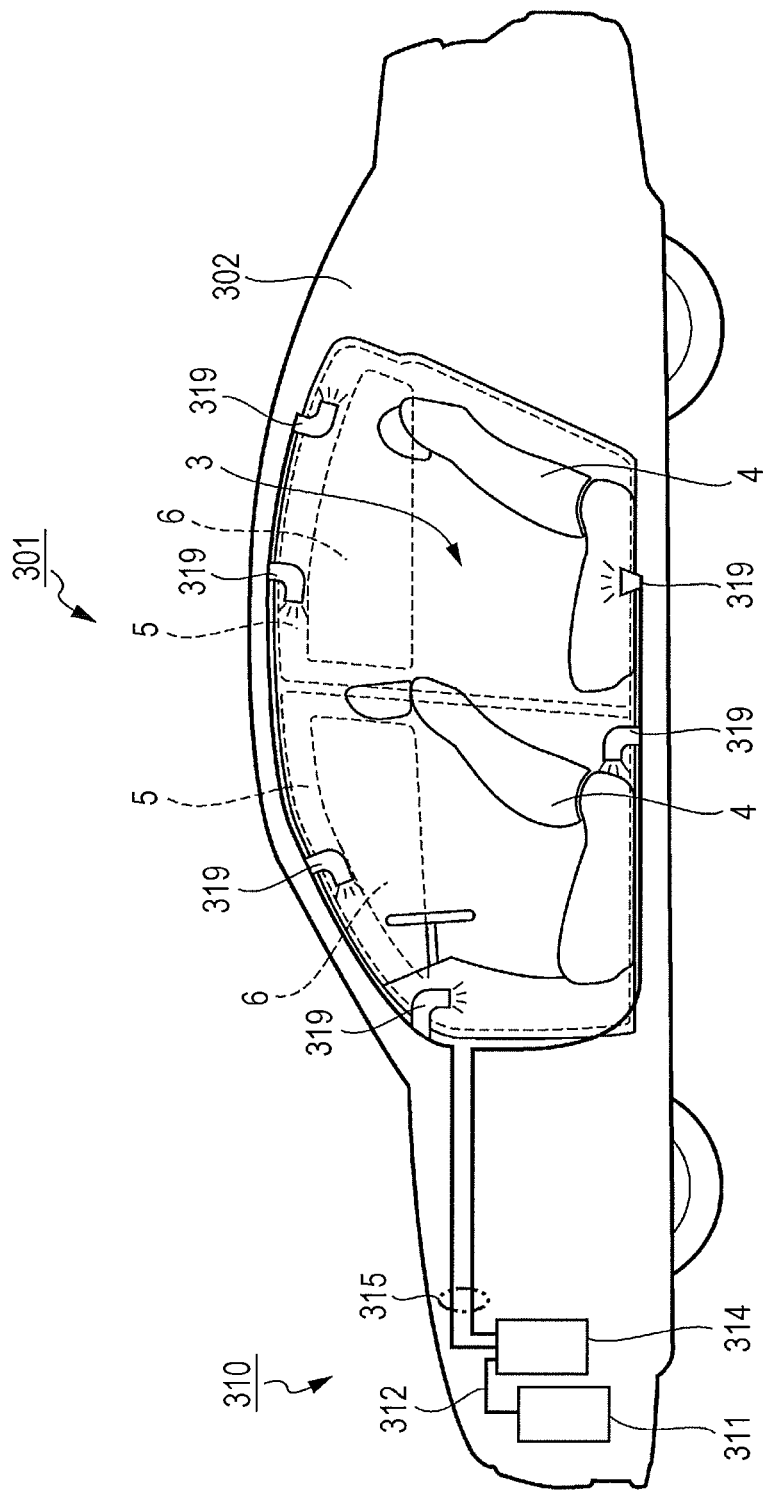
FIG. 9 is a partial transparent side view of the vehicle body of an automobile employing a cooling apparatus according to a fifth embodiment of the present invention.

FIG. 9 is a partial transparent side view of an automobile 301 employing the cooling apparatus according to the first embodiment of the present invention. Note that description will be omitted regarding the same contents as with the first and second embodiments. The automobile 301 in FIG. 9 includes a vehicle body 302.

With the present embodiment, a cooling apparatus 310 is employed in which the compressed air is released into the passenger space before a user who attempts to get into the vehicle, thereby rapidly cooling the passenger space.

Figure 10:
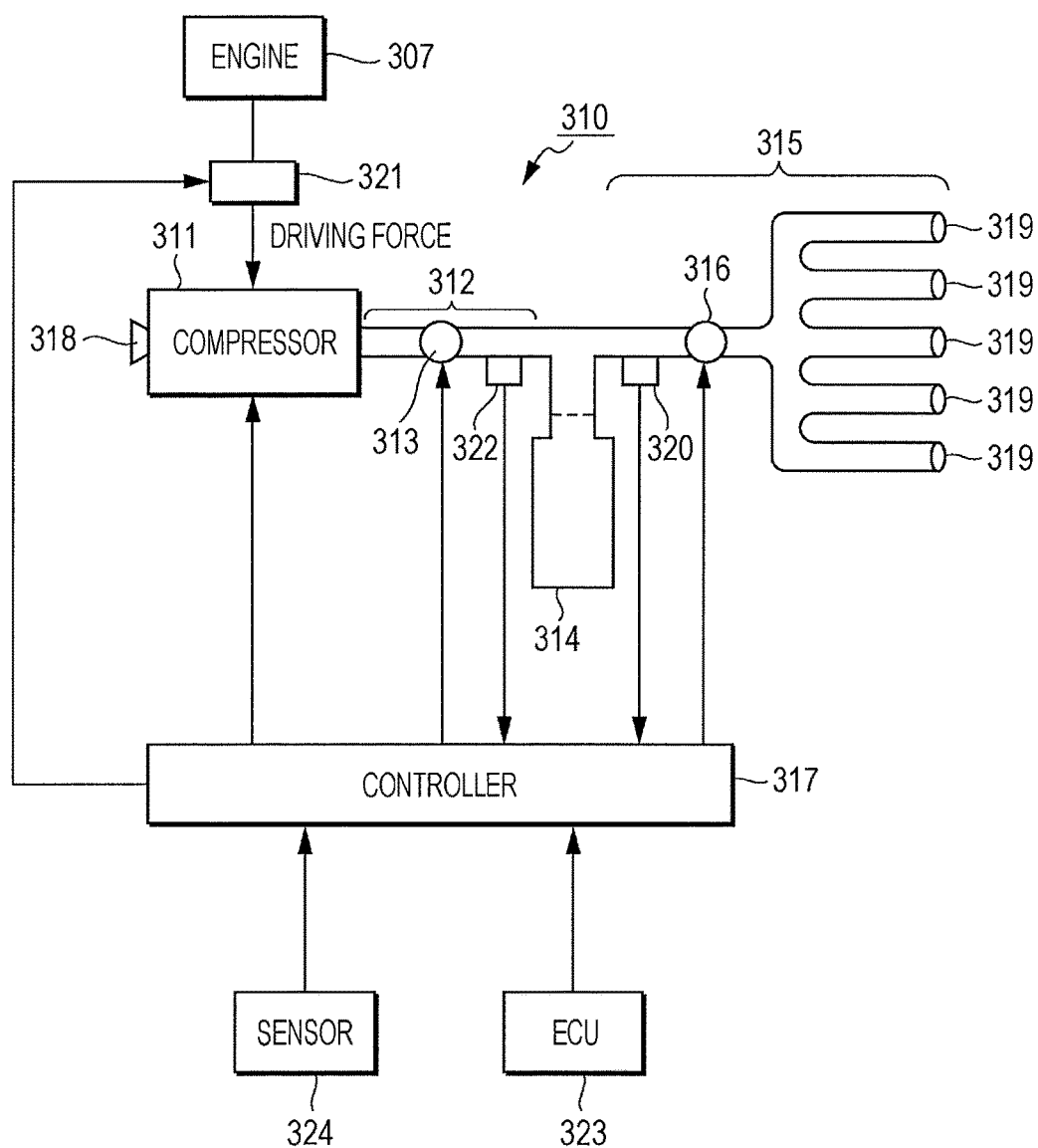
FIG. 10 is a configuration diagram of the cooling apparatus to be mounted on the automobile in FIG. 9.

FIG. 10 is a configuration diagram of the cooling apparatus 310 to be mounted on the automobile 301 in FIG. 9. The cooling apparatus 310 in FIG. 10 cools the passenger space 3 by releasing the compressed air into the passenger space 3 in FIG. 9.

The configurations of the cooling apparatus 301, compressor 311, air intake duct 312, air intake valve 313, tank 314, discharge air duct 315, discharge valve 316, controller 317, intake vent 318, and discharge vent 319 are basically the same as those in the first and second embodiments. Description will be omitted regarding the same configurations as with the first and second embodiments.

The intake vent 318 of the compressor 311 may be provided in the passenger space 3, or may be provided out of the automobile 301 (out of the passenger space 3).

With the present embodiment, the intake vent 318 is provided in the passenger space 3 so as to absorb the inner air. The inner air is adjusted to comfortable temperature and humidity by taking advantage of the air conditioning apparatus while the user gets into the vehicle. Accordingly, the inner air is compressed and stored in the tank 314, whereby a cooling effect for suitable temperature using this compressed air can be expected while decreasing the pressure of the compressed air to be released into the passenger space 3 in a state in which the user gets into the vehicle. The discharge vent 319 of the discharge air duct 315 is provided in the passenger space 3.

In the event of releasing the compressed air while the user gets into the vehicle as with the present embodiment, so as to prevent the high-pressure air from spraying on the face or the like to make a passenger feel uncomfortable, the discharge vent 319 is provided in a position or direction where the air is not released toward a person who has sit in a seat position in the passenger space 3.

For example, the discharge vent 319 is, as illustrated in FIG. 9, provided to the inner portion of a dashboard or seat 4 provided in the passenger space 3. In addition to this, there are the roof and trunk room as in-vehicle facilities where the discharge vent 319 can be installed.

Also, as illustrate in FIG. 9, the discharge vent 319 is provided toward the roof and the back surfaces of the seats 4. In addition to this, there are the handle and dashboard and so forth as a location where the discharge vent 319 can be directed.

In this way, the discharge vent 319 is provided to the inner portion of an in-vehicle facility, or provided to be directed toward the inner side of the vehicle or an in-vehicle facility making up the passenger space 3, whereby the user can be prevented from receiving uncomfortable feeling while increasing the pressure of the compressed air to be released from the discharge vent 319.

Specifically, when assuming that space occupied by a passenger at the time of the passenger taking a seat in the passenger space 3 is taken as first passenger space, and space other than the first passenger space in the passenger space 3 is taken as second passenger space, the discharge vent 319 of the compressed air is provided so as to release toward the second passenger space, whereby the compressed air can be prevented from directly spraying upon the sitting passenger.

In order to obtain various types of information to be used for control processing or determination, various signals are input to the controller 317. Examples of such signals include a detection signal of a seat belt wearing sensor, a detection signal of a seat sensor embedded in the seats 4, an image signal of an in-vehicle monitor camera, an unlocking signal or locking signal of the door panel 5, and a confirmation signal that there is a smart key 325 in the vehicle.

Also, there are a detection signal of the temperature or humidity of the passenger space 3, a detection signal of the temperature of the compressed air in the tank 314, an opening/closing detection signal of the window glass 6 or door panel 5, and an operation detection signal of the air conditioning apparatus mounted on the vehicle body 302. These signals may directly be input from each detection sensor 324, or may be input from an ECU 323.

Next, the operation of the cooling apparatus 310 in FIG. 10 will be described. FIG. 3 is a flowchart illustrating the entirety of a cooling process of the cooling apparatus 310 in FIG. 10.

With the overall control in FIG. 3, the controller 317 of the cooling apparatus 310 first executes an air compressing process (step ST1).

The controller 317 executes the compressing process, for example, when the user gets into the vehicle, after the user gets into the vehicle, or when the user is likely to get into the vehicle.

Upon the pressure of the pressure sensor 320 reaching equal to or greater than a predetermined reference value, the controller 317 stops the compressor 311, and closes the air intake valve 313. In the event of employing an electromagnetic clutch 321, the controller 317 blocks this. Thus, the air intake valve 313 and discharge valve 316 both become a closed state, and the compressed air of which the pressure is equal to or greater than a reference value is stored in the tank 314 (storing process, step ST2).

Note that predetermined reference pressure for stopping storing of the compressed air in the tank 314 has to be higher than the atmospheric pressure. However, with the present embodiment, the compressed air is released into the passenger space 3 in a state in which the user is in the vehicle, and accordingly, it is desirable to suppress pressure to the extent of a suitable flow of the air being formed to the extent of preventing the user from receiving uncomfortable feeling.

Incidentally, the air generates heat when compressed. The compressed air housed in the tank 314 is cooled along with the tank 314 after completion of compression. For example, in the event that the tank 314 does not have a heat-insulated configuration, the temperature of the compressed air is cooled to the same temperature as the external temperature of the tank 314. Thus, with the storing process after the compressed air is supplied to this tank 314, the temperature of the compressed air within the tank 314 is cooled to normal temperature, for example.

Accordingly, in the event of compressing the inner air, it is desirable that the tank 314 has a heat-insulated configuration, or the tank 314 is installed in the trunk room or the like where the temperature is hardly increased. Thus, the air which the user feels to be comfortable at the time of the last cooling can be released into the passenger space 3.

Next, the controller 317 executes the releasing process (step ST3).

The controller 317 executes the releasing process after the user gets into the vehicle, for example. The controller 317 determines that the user has got into the vehicle using a detection signal of a seat belt wearing sensor, a detection signal of a seat sensor, an image signal of an in-vehicle monitor camera, a locking signal after unlocking the door panel 5, and a confirmation signal that there is a smart key 325 in the vehicle.

With the releasing process, the controller 317 opens the discharge valve 316 while closing the air intake valve 313. Thus, the compressed air stored in the tank 314 is discharged into the passenger space 3 through the discharge nozzle.

The compressed air is expanded within the passenger space 3, and the room temperature of the passenger space 3 is lowered by endothermic reaction accompanied with expansion. Also, the controller 317 executes the releasing process after the user gets into the vehicle. Thus, the wind according to the compressed air is applied to the user who has got into the vehicle, and the user is cooled and refreshed.

In particular, with the present embodiment, upon the pressure in the tank 314 reaching predetermined pressure, the controller 317 ends the compressing process. Thus, the pressure of the compressed air to be released into the passenger space 3 can be prevented from applying uncomfortable feeling to the user.

The pressure of the compressed air is controlled so as to be generally fixed pressure, whereby a certain effect can be expected as a cooling effect using the compressed air. Also, fluctuation of the pressure of the passenger space 3 after the compressed air is released can be suppressed within a certain range. Occurrence of trouble due to pressure increase can be suppressed.

Sixth Embodiment

The fifth embodiment is an example of the basic configuration and operation of the cooling apparatus 310 which cools the passenger space 3 using the compressed air. A sixth embodiment is an improved example of the releasing process of the cooling apparatus 310 according to the fifth embodiment. The configurations of the vehicle and cooling apparatus 310 in the sixth embodiment are the same as those in the fifth embodiment.

Figure 11:
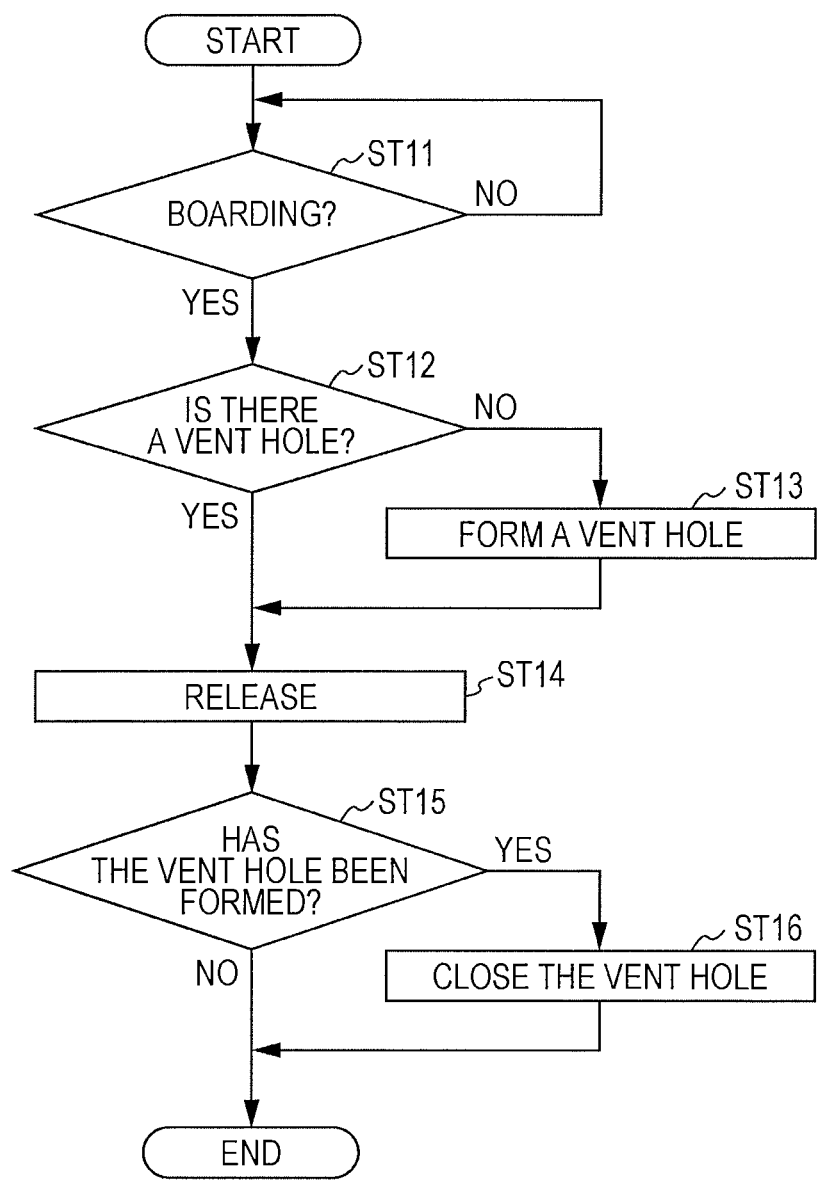
FIG. 11 is a flowchart of a releasing process according to a sixth embodiment of the present invention.

FIG. 11 is a flowchart of the releasing process of the cooling apparatus 310 according to the second embodiment of the present invention. As illustrated in FIG. 11, with the releasing process, the controller 317 is in a state waiting for the user's boarding (step ST11).

The user's boarding can be confirmed by a detection signal of a seat belt wearing sensor, a detection signal of a seat sensor, an image signal of an in-vehicle monitor camera, a locking signal after unlocking the door panel 5, and a confirmation signal that there is a smart key 325 in the vehicle, for example.

Upon confirming the user's boarding, the controller 317 confirms whether or not a vent hole between the passenger space 3 and the outside has been secured (step ST12).

The controller 317 determines, based on an input signal, for example, whether or not the door panel 5 is in an opened state, and whether or not the window glass 6 is in an opened state. Also, the controller 317 confirms whether or not the operation mode of the air conditioning apparatus is the external air introduction mode. In the even that no vent hole has been secured, the controller 317 secures a vent hole (step ST13).

The controller 317 opens the window glass 6, controls the air conditioning apparatus in the external air introduction mode, or opens the electric door panel 5. Such control may be executed by the ECU 323 under requesting of the controller 317. The controller 317 then executes the releasing process (step ST14).

The controller 317 opens the discharge valve 316 by the same control as with the fifth embodiment. Thus, the compressed air in the tank 314 is released into the passenger space 3. Upon releasing of the compressed air from the tank 314 being ended, the controller 317 ends the releasing process.

The controller 317 determines whether or not a vent hole has been formed for the releasing process (step ST15).

The controller 317 has to determine based on the presence of the control flag stored at the time of execution of the step ST13 whether or not a vent hole has been formed.

In the event that a vent hole has been formed, the controller 317 returns this vent hole to a state before control (step ST16). The controller 317 closes the window glass 6, returns the air conditioning apparatus to a mode other than the external air introduction mode, or closes the electric door panel 5, which have been controlled for securing the vent hole. As described above, the controller 317 releases the compressed air into the passenger space 3 after the user gets into the vehicle.

In particular, the controller 317 confirms whether or not there is a vent hole between the passenger space and the outside, secures the vent hole, and then releases the compressed air into the passenger space 3. Accordingly, even if the pressure of the compressed air is slightly increased, the user can be prevented from receiving uncomfortable feeling. Also, a cooling effect due to expansion of the compressed air can be expected.

Also, after releasing of the compressed air, the controller 317 closes the secured vent hole. Thus, a state cooled by the compressed air can be maintained.

Seventh Embodiment

A seventh embodiment is an example of the flowchart of the releasing process according to the sixth embodiment further being improved. The configurations of the vehicle and cooling apparatus 310 in the seventh embodiment are the same as those in the fifth embodiment.

Figure 12:
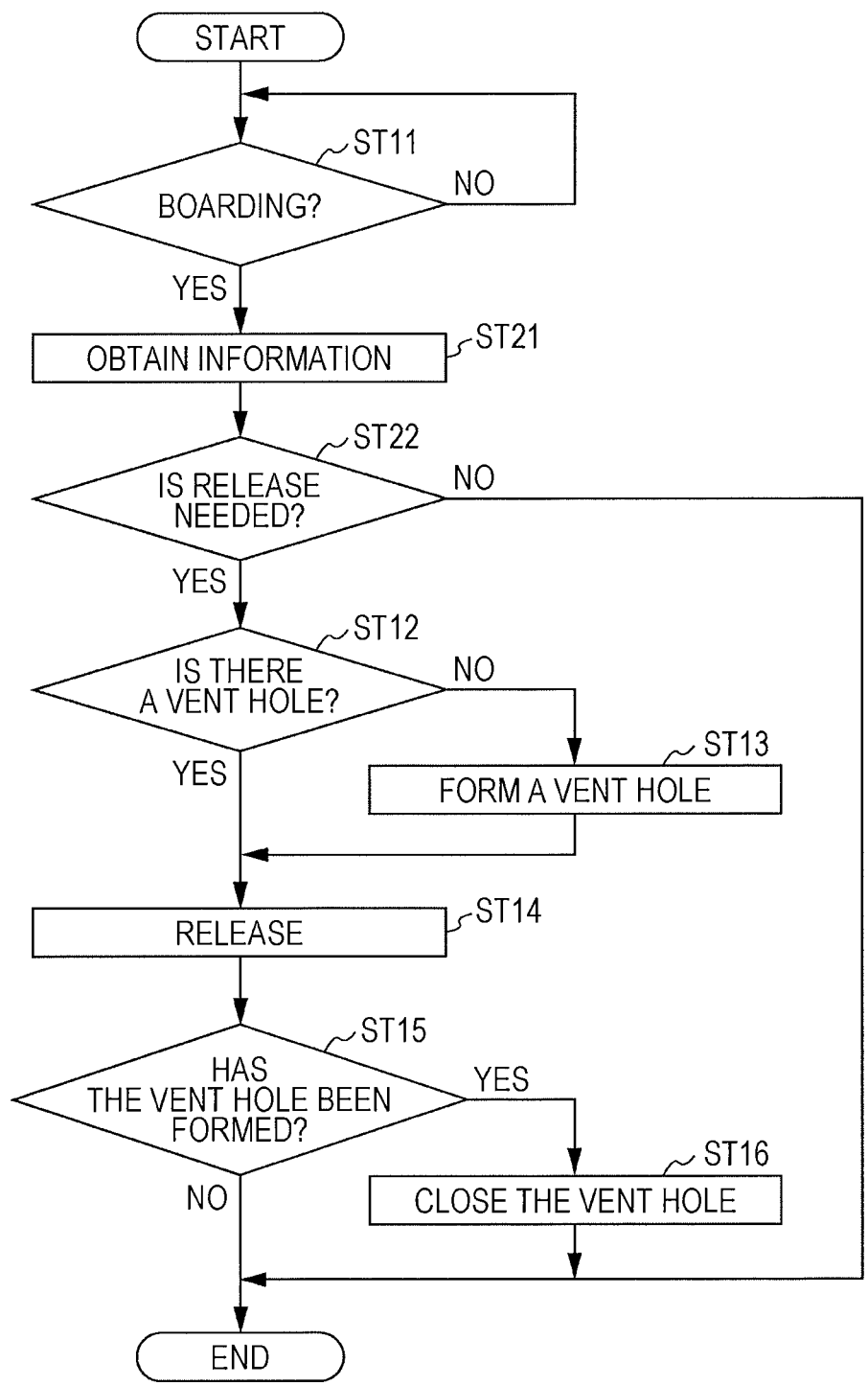
FIG. 12 is a flowchart of a releasing process according to a seventh embodiment of the present invention.

FIG. 12 is a flowchart of the releasing process of the cooling apparatus 310 according to the seventh embodiment of the present invention. With the flowchart in FIG. 12, the same steps as those in FIG. 11 are denoted with the same step numbers as with the sixth embodiment, and description thereof will be omitted.

With the flowchart in FIG. 12, upon confirming the user's boarding, the controller 317 obtains information for determining whether or not the releasing process is needed (step ST21).

The controller 317 obtains, for example, a detection signal of the temperature or humidity of the passenger space 3, a detection signal of the temperature of the compressed air in the tank 314, an opening/closing detection signal of the window glass 6 or door panel 5, an operation detection signal of the air conditioning apparatus mounted on the vehicle body 302, and so forth.

After obtaining information, the controller 317 determines whether or not the releasing process is needed, based on the obtained information (step ST22).

For example, in the event that the temperature or humidity of the passenger space 3 is low, cooling is not needed, and accordingly, the controller 317 determines that releasing is not needed. In the event that the temperature of the compressed air in the tank 314 is high, no high cooling effect can be expected, and accordingly, the controller 317 determines that releasing is not needed. In the event that the pressure of the compressed air in the tank 314 is higher than a predetermined value, the releasing pressure of the compressed air is high, and accordingly, the controller 317 determines to perform no releasing. In the event that the remaining amount of the battery is small, ignition voltage runs short, and the engine 7 may not be started, and accordingly, the controller 317 determines to perform no releasing.

In the event that the releasing process is determined not to be executed, the controller 317 ends the processing in FIG. 12 without executing the releasing process. In the event that the releasing process is determined to be executed, the controller 317 further confirms whether or not there is a vent hole (step ST12).

Also, the controller 317 secures a vent hole (step ST13), and then executes the releasing process.

As described above, in the event that the user has got into the vehicle, the controller 317 releases the compressed air into the passenger space 3. In particular, the controller 317 determines whether or not releasing is needed, based on the temperature or the like in the passenger space 3. Thus, wasteful releasing of the compressed air can be reduced.

What is claimed is:

1. A vehicle comprising:
   a passenger space to accommodate a passenger;
   a compressor to compress air;
   a tank to store compressed air; and
   a control unit to supply compressed air to the tank, and release compressed air from the tank into the passenger space, wherein
   the control unit supplies compressed air to the tank based at least on a determination that the vehicle is in a stopped condition with a drive power source stopped, and a determination there is no passenger in the passenger space, the control unit supplying compressed air to the tank based further on a storage condition of compressed air stored in the tank.

2. The vehicle according to claim 1, further comprising:
   a detector to detect the presence of a passenger within the passenger space, and communicate detection information to the control unit, wherein
   the control unit determines whether a passenger is within the passenger space based on information communicated from the detector.

3. The vehicle according to claim 2, wherein if the control unit determines an entry event of a passenger into the passenger space while supplying compressed air to the tank, the control unit stops the supplying of compressed air to the tank.

4. The vehicle according to claim 3, wherein the control unit releases compressed air from the tank into the passenger space based on a determination of an entry event of a passenger into the passenger space.

5. A cooling apparatus for cooling a passenger space of a vehicle, comprising:
   a compressor to compress air;
   a tank to store compressed air;
   a control unit to supply compressed air to the tank, and release compressed air from the tank into the passenger space; and
   a detector to detect the presence of a passenger in the passenger space, and communicate detection information to the control unit, wherein
   the control unit supplies compressed air to the tank based at least on a determination that the vehicle is in a stopped condition with a drive power source stopped, and a determination there is no passenger in the passenger space according to information communicated from the detector, the control unit supplying compressed air to the tank based further on a storage condition of compressed air stored in the tank.

6. A cooling method for cooling a passenger space of a vehicle, comprising:
   determining, via a control unit, that there is no passenger in the passenger space based on information communicated from one or more detectors;
   supplying, via the control unit, compressed air to a tank based at least on the determination that the vehicle is in a stopped condition in which there is no passenger in the passenger space and a drive power source is stopped, the control unit supplying compressed air to the tank based further on a storage condition of compressed air stored in the tank;
   determining, via the control unit, an entry event of a passenger into the passenger space based on information communicated from at least one of the one or more detectors; and
   releasing, via the control unit, compressed air from the tank into the passenger space based at least on the determination of the entry event of the passenger into the passenger space.

7. The vehicle according to claim 1, wherein the control unit determines an entry event of a passenger into the passenger space, and releases compressed air from the tank into the passenger space during a period of time spanning from a time prior to the passenger's entry into the passenger space to a time following the passenger's entry into the passenger space.

8. The vehicle according to claim 7, wherein
   the control unit releases, prior to the passenger's entry into the passenger space, high-pressure compressed air from the tank, and
   the control unit releases, following the passenger's entry into the passenger space, low-pressure compressed air remaining in the tank following the release of high-pressure compressed air.

9. A cooling apparatus to cool a passenger space of a vehicle, comprising:
   a compressor to compress air;
   a tank to store compressed air; and
   a control unit to supply compressed air to the tank, and release compressed air from the tank into the passenger space, wherein
   the control unit supplies compressed air to the tank based at least on a determination that the vehicle is in a stopped condition with a drive power source stopped, and a determination there is no passenger in the passenger space, the control unit supplying compressed air to the tank based further on a storage condition of compressed air stored in the tank, and
   the control unit determines an entry event of a passenger into the passenger space, and releases compressed air from the tank into the passenger space during a period of time spanning from a time prior to the passenger's entry into the passenger space to a time following the passenger's entry into the passenger space.

10. A cooling method for cooling a passenger space of a vehicle, comprising:
    supplying, via a control unit, compressed air to a tank based at least on a determination by the control unit that the vehicle is in a stopped condition with a drive power source stopped, and a determination that no passenger is in the passenger space, the control unit supplying compressed air to the tank based further on a storage condition of compressed air stored in the tank;

determining, via the control unit, an entry event of a passenger into the passenger space; and releasing, via the control unit, compressed air from the tank into the passenger space during a period of time spanning from a time prior to the passenger's entry into the passenger space to a time following the passenger's entry into the passenger space.

11. The vehicle according to claim 1, wherein the control unit releases compressed air from the tank into the passenger space following a passenger entry into the passenger space.

12. The vehicle according to claim 11, further comprising
one or more detectors to detect the presence of a passenger within the passenger space, and communicate detection information to the control unit, wherein
the control unit determines a passenger's entry into the passenger space based on detection information communicated from at least one of the one or more detectors.

13. The vehicle according to claim 12, wherein
the one or more detectors comprises at least one member selected from the group of: a seat-belt sensor; seat sensor; an in-vehicle monitor camera and a smart key sensor.

14. The vehicle according to claim 12, further comprising:
a number of discharge vents for discharging compressed air from the tank into the passenger space, wherein
space occupied by a passenger in the passenger space is defined as first passenger space, and space other than the first passenger space in the passenger space is defined as second passenger space,
the number of discharge vents comprises at least one discharge vent positioned to discharge compressed air into the first passenger space and at least one discharge vent positioned to discharge air into the second passenger space, and
the control unit releases compressed air from the tank via a discharge vent positioned to discharge compressed air into the second passenger space.

15. The vehicle according to claim 11, wherein
the control unit determines, before releasing compressed air from the tank into the passenger space, whether there is a ventilation opening in a state that communicates the passenger space with an environment outside the vehicle, and
if the control unit determines there is no ventilation opening in a state that communicates the passenger space with an environment outside the vehicle, the control unit adjusts a first ventilation opening to a state that communicates the passenger space with an environment outside the vehicle before releasing compressed air from the tank into the passenger space.

16. The vehicle according to claim 15, wherein, following the release of compressed air from the tank into the passenger space, in a condition where the first ventilation opening was in the state that communicates the passenger space with the environment outside the vehicle before releasing the compressed air, the control unit returns the first ventilation opening to that state it was in prior to being adjusted by the control unit.

17. The vehicle according to claim 16, wherein the control unit adjusts, as the first ventilation opening, at least one member selected from the group of: a window glass; a door; and an external air introduction mode of an air conditioning apparatus.

18. A cooling apparatus for cooling a passenger space of a vehicle, comprising:
a compressor to compress air;
a tank for storing compressed air; and
a control unit that supplies compressed air to the tank, and releases compressed air from the tank into the passenger space, wherein
the control unit supplies compressed air to the tank based at least on a determination that the vehicle is in a stopped condition with a drive power source stopped, and a determination that no passenger is in the passenger space, the control unit supplying compressed air to the tank based further on a storage condition of compressed air stored in the tank, and
the control unit releases compressed air from the tank into the passenger space based at least on a determination that a passenger has entered the passenger space.

19. A cooling method for cooling a passenger space of a vehicle, comprising:
supplying, via a control unit, compressed air to a tank based at least on a determination by the control unit that the vehicle is in a stopped condition with a drive power source stopped, and a determination that no passenger is in the passenger space, the control unit supplying compressed air to the tank based further on a storage condition of compressed air stored in the tank; and
releasing, via the control unit, compressed air from the tank into the passenger space, based at least on a determination by the control unit that a passenger has entered the passenger space.

20. The vehicle according to claim 1, wherein
the drive power source that is stopped during a stopped condition of the vehicle is an engine.

* * * * *